United States Patent [19]

Fedde

[11] Patent Number: 4,533,956
[45] Date of Patent: Aug. 6, 1985

[54] APPARATUS FOR CONVERTING FACSIMILE CODED DATA TO VIDEO DATA

[75] Inventor: Mickiel P. Fedde, Eagan, Minn.

[73] Assignee: Minnesota Mining and Manufacturing Co., St. Paul, Minn.

[21] Appl. No.: 420,564

[22] Filed: Sep. 17, 1982

[51] Int. Cl.³ .............................................. H04N 1/00
[52] U.S. Cl. .................................... 358/260; 358/261; 358/280
[58] Field of Search ............... 358/260, 261, 263, 280; 346/76 PH, 78, 94

[56] References Cited

U.S. PATENT DOCUMENTS 4,376,933  3/1983  Sarah et al. .......................... 358/261

Primary Examiner—John C. Martin
Assistant Examiner—Edward L. Coles
Attorney, Agent, or Firm—Donald M. Sell; James A. Smith; William D. Bauer

[57] ABSTRACT

An apparatus for converting facsimile coded data to video data utilizing a programmed digital computer for receiving the facsimile coded data buffering the facsimile coded data and converting the facsimile coded data to a fixed length intermediate code. The fixed length intermediate code is then hardware converted to the video data.

4 Claims, 2 Drawing Figures

APPARATUS FOR CONVERTING FACSIMILE CODED DATA TO VIDEO DATA

BACKGROUND OF THE INVENTION

The present invention relates generally to data convertors and more particularly to apparatus for converting facsimile coded data to video data.

Facsimile machines are used for transmitting a document or picture from a first location to a second location over communication lines, such as telephone lines, without the necessity of physically transporting the document or picture. Such facsimile machines scan the information bearing document on a line by line basis. The facsimile machines then produce a particular code indicative of the information content of the document or picture. The code is then sent over communication lines to a similar facsimile machine. The second facsimile machine then interprets the code received and uses a printer to reproduce the original document or picture.

The scanning of the information bearing document, the definition of the transmitted codes, the transmission of the codes, and the printing of the copy of the document are all standard, known elements in facsimile machines. An example of the transmitted codes are defined by International Telegraph and Telephone Consultative Committee (CCITT) specifications. All facsimile machines adhering to this specification can then decode the information and reconstruct the original information bearing document.

CCITT codes are transmitted between one of several varieties of facsimile machines. The apparatus and method of the present invention can be used in decoding facsimile coded data which results from CCITT group 3 codes or rather those codes required of a CCITT group 3 facsimile machine. Group 3 codes are defined in two varities; namely, one dimensional (1D) codes and two dimensional (2D) codes. 1D codes interpret the information content of one line, namely the current line being scanned and the code produced is indicative of the serial run lengths of the information contained therein and result in Huffman codes being produced. Similarly the receiving facsimile machine receives the Huffman codes and reproduces the information bearing document by converting the serial run lengths of the Huffman codes by printing the document on a line by line basis. 2D codes interpret not only the current line but are also dependent on the information content of a previous line, usually the previous line scanned. 2D codes compress the information content of an information bearing document into a fewer number of bits than 1D codes resulting in decreased transmission times, but require a more complicated decoder. While encoding or decoding a document containing printing or graphical information, on many occasions a vertical or other vertically correlated edge (or line) will be present in the document. In order to accurately reflect these vertical correlations it is advantageous to compare the vertical correlation of a change in the binary information content of a current line with a change in the binary information content of a previous line (usually the prior line).

The scanning during encoding of a document and printing after decoding is usually accomplished on a line by line basis. Each line is divided into a predetermined number of elements called picture elements. The information bearing document or picture is scanned and encoded in a binary (i.e. black and white) basis. All discrete picture elements (PELs) are represented as either black or white (with a representation in binary language of either a 1 or a 0). A change in the binary information content of the information bearing document is a change (black to white, e.g. 1 to 0; or white to black, e.g. 0 to 1) in the representation of the color (black or white) of the picture element currently being scanned or decoded (the current picture element) from the color (black or white) of the picture element of the last scanned or decoded picture element (prior picture element). Hence a color change refers to a change in color (black and white) of the picture elements.

2D codes represent the encoding of the vertical correlation between a color change between picture elements and the current line with a color change between picture elements in a prior line, usually the previous line as well as incorporating the run length capabilities of 1D codes. Such vertical correlation may be exactly vertical or the correlation may be within a certain predetermined range of vertical. In a typical facsimile machine in coding situation, a "window" is defined by examining vertical correlation within three horizontal (if the document is being scanned horizontally) picture elements. Thus, the "vertical correlations" considered are a "vertical 0 (V0)", with a color change in a previous line exactly vertical with the color change in the current line, "vertical left 3 (VL3)", with a color change in a prior line occurring three elements to the left of a color change in the current line, and correspondingly a "vertical left 2 (VL2)", a "vertical left 1 (VL1)", a "vertical right 1 (VR1)", a "vertical right 2 (VR2)" and a "vertical right 3 (VR3)".

Further a decoding apparatus and method of the scope of the present invention is required to perform in a number of other different modes. These modes are supplied by an external command along a command interface supplied to the decoder. Examples of other modes of operation include an ASCII mode which converts binary data to a 7×11 dot matrix pattern for printing and a self diagnostic mode which produces standard test patterns to adequately query the decoder to ensure its proper operation.

Thus a decoder of the scope of the present invention must be versatile while still being fast enough to transmit an entire information bearing document within a reasonable length of time.

Pure hardware implementations for decoding facsimile coded data have been accomplished in the prior art. These implementations suffer the disadvantage of not being versatile. Pure hardware implementations must have specific hardware in order to perform each individual task. This hardware and its resultant function is not easily upgraded if, for example, the CCITT specification changes or a new specification is produced. If this occurs, then a new hardware design is required.

It is anticipated that a pure software solution for converting facsimile coded data to video data could also be achieved. Such a solution would be extremely flexible in order to change the decoding alogorithm it would only be necessary to load a new program or to replace a program contained in read only memory. However, such a pure software solution would result in very slow decoding. The number of codes required to adequately describe a given document would make the decoder very slow and the resultant transmission time of the document long.

SUMMARY OF THE INVENTION

Present invention provides an apparatus for converting facsimile coded data to video data. The apparatus uses a programmed digital computer for receiving the facsimile coded data, buffering the facsimile coded data, and converting the facsimile coded data to a fixed length intermediate code. A video convertor is then responsive to the programmed digital computer and converts the fixed length intermediate code to the desired video data.

In a preferred embodiment the programmed digital computer includes a microprocessor capable of executing a series of instructions along with a read only memory containing the series of instructions and being capable of supplying the instructions to the microprocessor. Further an interface module is provided for receiving the facsimile coded data along with a randomly accessible memory coupled to the interface module and to the microprocessor for holding and buffering the facsimile coded data and for holding a table lookup for converting the facsimile coded data to the intermediate code. A direct memory access controller is coupled to the microprocessor, is coupled to the randomly accessible memory, and is coupled to the interface module and to the video convertor. The direct memory access controller transfers the facsimile coded data from the interface module to the randomly accessible memory and transfers the intermediate code from the randomly accessible memory to the video convertor under control of the microprocessor.

In a preferred embodiment the video convertor includes an instruction register for receiving the intermediate code from the randomly accessible memory. A line counter is coupled to the instruction register for counting the number of picture elements in a current line of the facsimile coded data decoding. A history memory is coupled to the line counter for holding data of the picture elements in a line prior to the current line. A shift register is coupled to the history memory for holding data of picture elements in a line prior to the current line which is within a predetermined number of picture elements to the current one of the picture elements in the current line. A vertical logic array is coupled to the instruction register and to the shift register for determining the vertical correlations between the picture elements within the window with the current one of the picture elements in the current line. A horizontal logic array is coupled to the instruction register to the history memory, and to the vertical logic array for determining the video output data based upon the intermediate code in the instruction register. Further, a video interface logic array is coupled to the horizontal logic array and to the vertical logic array for outputting the video output data.

The present invention solves the problem by dividing the facsimile coded data to video data conversion task into two separate and distinct parts.

First, the front end work of determining the mode of operation, i.e. 1D, 2D, ASCII, etc., receiving the facsimile coded data code words, identifying the code words in the incoming data stream, buffering the code words until they can be processed, and supplying the code words to the video convertor is all done by control of a programmed digital computer providing all the versatility advantages of such a computer. Further, in order to ease the task of the remaining system the variable length facsimile coded data is converted to a fixed length intermediate code. Subsequent hardware is made much simpler with a fixed length code word (or instruction, not to be confused with an instruction for a programmed digital computer) than the variable length CCITT codes. Second, a hardware video convertor then converts the specific intermediate code word (or instruction) into video data for printing and the reproduction of the original document. Specific hardware modules can be added to the video convertor to perform 1D or 2D decoding or other specific modes such as ASCII conversion. The hardware video convertor takes the fixed length intermediate codes (instructions) and rapidly processes them to produce video data at a high rate of speed. The hardware implementation can perform the data conversions very quickly. Note that the instruction word provided to the video convertor provides a fixed length instruction or code which has already been extracted from the incoming data bit stream and which has been buffered by the software to be ready for immediate use.

The unique aspects of the present invention involve the use of a programmed digital computer for versatile set up, data preparation, buffering functions, and uses hardware for the repetitive standard data conversion operation. It is estimated that the present invention operates faster and more efficiently than with either a pure software solution or a pure hardware solution. The use of the best of both worlds of software and hardware result in the achievement of the unique synergistic operation of the present invention.

BRIEF DESCRIPTION OF THE DRAWINGS

The foregoing advantages, construction, and operation of the present invention will become more readily apparent from the following description and accompanying drawings in which.

DETAILED DESCRIPTION OF THE PREFERRED EMBODIMENTS

As previously mentioned, the function of an apparatus and method for converting facsimile coded data to video data is to convert standard, predetermined codes such as CCITT codes transmitted over common communication lines to a format which may be utilized by line printer to reconstruct the original document encoded at the origin by an encoding facsimile machine.

The encoding process is the subject of a U.S. patent application, Ser. No. 416,138, filed Sept. 9, 1982, by John A. Harrington, entitled Apparatus for Producing a Code Word, now U.S. Pat. No. 4,509,194, and assigned to Minnesota Mining and Manufacturing Company, the assignee of the present invention, which application is hereby incorporated by reference.

The apparatus of the present invention decodes the standard facsimile coded data by utilizing a multistep process. Under software control the variable length facsimile coded data is received and buffered in a randomly accessible memory. The CCITT fax codes can vary in length from one bit to thirteen bits. The software further uses a table lookup process to convert the variable length facsimile coded data to a fixed length, bytewide (eight bit) code words. The software then transfers these individual fixed length intermedite code instructions to a hardware video convertor which converts the intermediate code instruction to actual black/white video data suitable for use by a printer in reconstructing the original document on a line by line basis.

Figure 1:
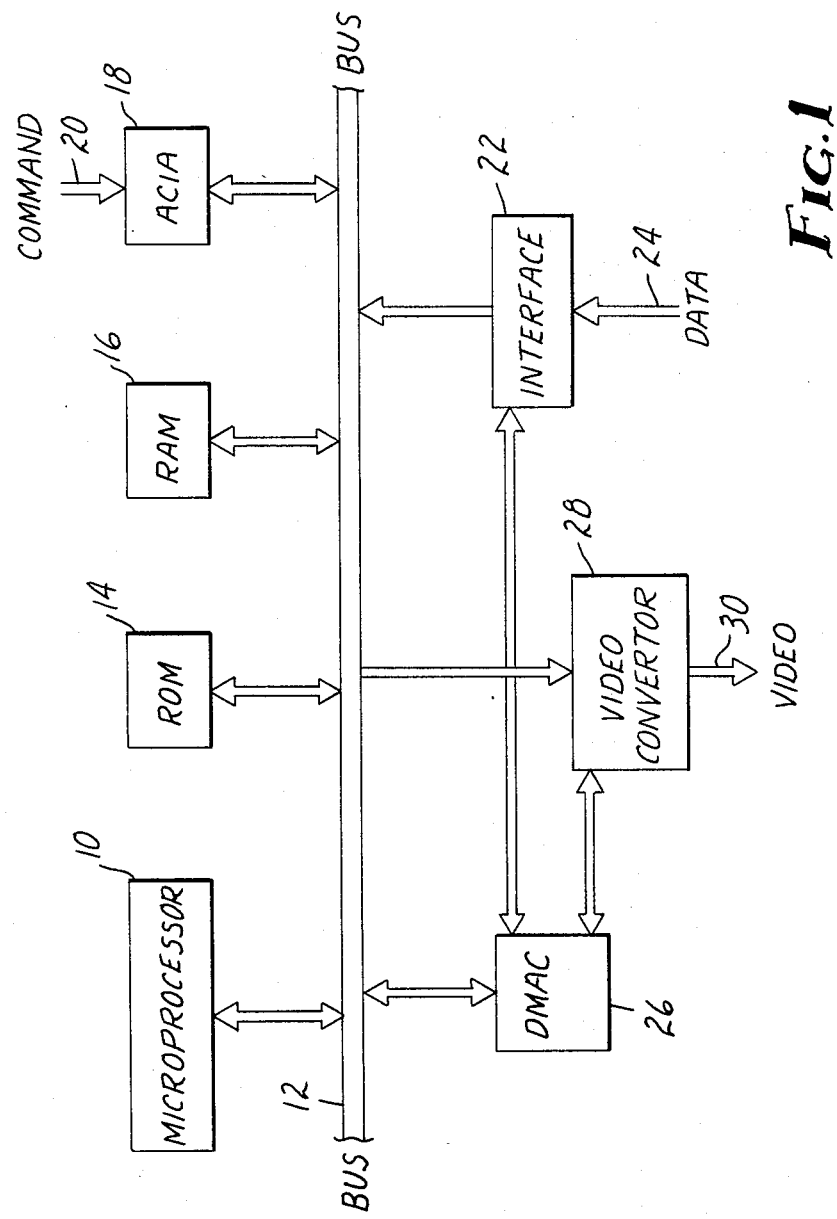
FIG. 1 is a block diagram of the apparatus of the present invention.

Operation of the apparatus of the present invention may be more readily understood by reference to FIG. 1 which is a block diagram of the apparatus. The major control element of the apparatus of the present invention is a microprocessor 10. In a preferred embodiment the microprocessor 10 is a microprocessor Model 6809 manufactured by Motorola. The microprocessor 10 communicates via a data bus 12. A read only memory (ROM) 14 also communicates via data bus 12. The read only memory 14 contains the software instructions which control the operation of the microprocessor 10. In a preferred embodiment the read only memory 14 is an 8K by 8 bit read only memory device such as a Model 2564 manufactured by Texas Instruments. A randomly accessible memory 16 also communicates via data bus 12. Randomly accessible memory 16 provides working storage for the microprocessor 10 which includes temporary storage of the received facsimile coded data, buffer space for the produced intermediate codes as well as program work storage for the microprocessor 10. In a preferred embodiment, the randomly accessible memory 16 is a 2K by eight bit RAM such as a Model 4802 manufactured by Mostek. An asynchronous communications interface adapter 18 communicates via data bus 12 and receives external commands from command bus 20 providing a control interface for initiating and terminating the various modes of operation of the apparatus. In a preferred embodiment, during ASCII mode, ASCII characters are transmitted through this interface. In a preferred embodiment, the asynchronous communications interface adapter is a Model 6850 manufactured by Motorola. Data interface module 22 receives the incoming facsimile coded data via data bus 24 and transmits the facsimile coded data to the randomly accessible memory 16 via data bus 12. In a preferred embodiment the interface module 22 is a Model 74LS374 manufactured by Texas Instruments. Digital memory access controller 26 also communicates via data bus 12. The digital memory access controller 26 operating under control of the microprocessor 10 provides the handshake interface for interface module 22 and further provides initialization and control information to video convertor 28. The direct memory access controller also controls all memory data transfers between the randomly accessible memory 16 and the video convertor 28. In a preferred embodiment the digital memory access controller 26 is a Model 6844, manufactured by Motorola. Video convertor 28 receives intermediate code word instructions from randomly accessible memory 16 via the data bus 12 under control of the direct memory access controller 26. The video convertor 28 is the hardware portion of the apparatus for converting the intermediate code word instructions to video data and supplying video data via video data bus 30 for use in a standard state of the art printer for the reproduction of the original facsimile coded document.

The facsimile coded data is received over data bus 24 by the interface module 22. Under control of the direct memory access controller 26 the facsimile coded data is transferred via the data bus 12 to the randomly accessible memory 16. Once in the randomly accessible memory 16 the microprocessor 10, under control of the instructions in the read only memory 14, searches the facsimile coded data for a particular facsimile code (e.g. 1D or 2D) in that facsimile coded data. When a particular facsimile code is found it is converted by a table lookup process into a fixed length (preferably eight bit) intermediate code which is also placed into randomly accessible memory 16. Under control of the direct memory access controller 26 the intermediate code word is transferred from the randomly accessible memory 16 via the data bus to the hardware video convertor 28 where the intermediate code operates as an instruction for the hardware video convertor 28. In addition to converting the facsimile coded data to intermediate codes, the microprocessor 10 also controls the direct memory access controller 26 by specifying into which blocks of randomly accessible memory 16 the direct memory access controller 26 should place and retrieve data as well as initializing the direct memory access controller 26.

A list of the intermediate code words utilized in a preferred embodiment of the apparatus of the present invention is described in Table I.

TABLE I

INTERMEDIATE CODE WORDS

| Bit | | | | | | | | |
|---|---|---|---|---|---|---|---|---|
| 7 | 6 | 5 | 4 | 3 | 2 | 1 | 0 | Description |
| 1 | O | X | X | X | X | X | X | Make-Up Count |
| O | O | X | X | X | X | X | X | Terminate Count |
| O | 1 | O | O | O | O | O | O | VL3 |
| O | 1 | O | O | O | O | O | 1 | VL2 |
| O | 1 | O | O | O | O | 1 | O | VL1 |
| O | 1 | O | O | O | O | 1 | 1 | VO |
| O | 1 | O | O | O | 1 | O | O | VR1 |
| O | 1 | O | O | O | 1 | O | 1 | VR2 |
| O | 1 | O | O | O | 1 | 1 | O | VR3 |
| O | 1 | O | O | O | 1 | 1 | 1 | Pass |
| O | 1 | O | 1 | 1 | O | O | O | Start New Line |

A preferred embodiment of the software contained in the read only memory 14 suitable for operating the microprocessor 10 in the manner described can be found by reference to the software source code listing enclosed with this application and made part of the specification hereof. This computer program listing is submitted under the provisions of 37 CFR 1.96 and is located at the end of the description but before the claims. The computer program listing also contains guiding comments describing the flow of data and operation of the computer program listing.

Figure 2:
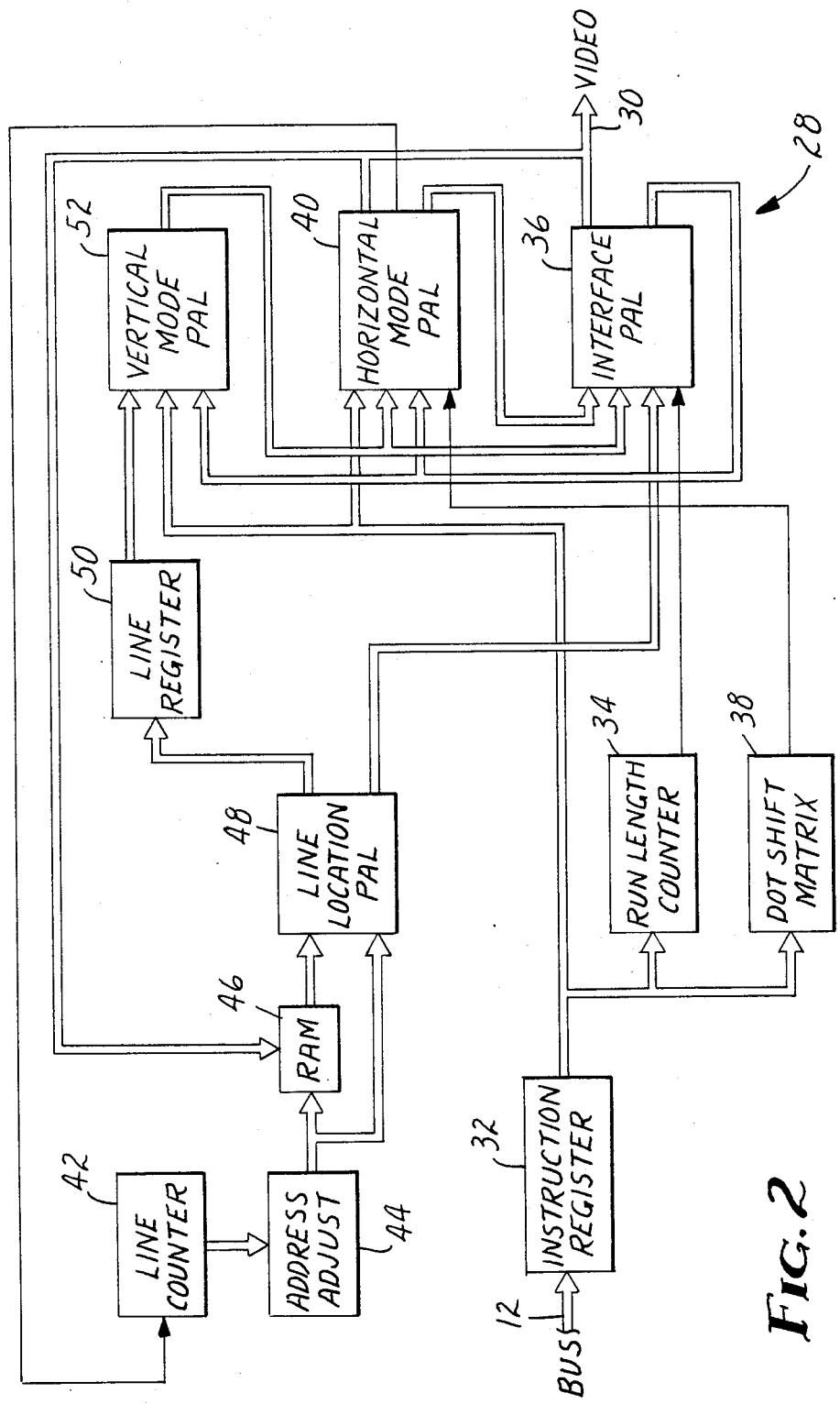
FIG. 2 is a block diagram of the hardware video convertor of the apparatus of the present invention.

A more detailed description of the hardware implementation of the video convertor 28 may be had by reference to FIG. 2. The intermediate code word instructions are supplied via data bus 12 to the video convertor and placed in instruction register 32. Makeup and terminate intermediate codes are processed via run length counter 34 which counts the codes to zero and supplies the resulting termination to interface programmed logic array 36. In ASCII mode, the intermediate code word instruction contained in instruction register 32 is supplied to dot shift matrix 38 for immediate conversion to an ASCII character dot sequence and supplied to horizontal mode programmed logic array 40 for transmission on the video data bus 30. A line counter 42 is reset by the horizontal mode programmed logic array 40 at the initialization, or start, of every given line. The line counter 42 along with address adjust module 44 keeps track of the current picture element being printed or current picture element whose data is being converted on the line by line scan basis in the document. In this preferred embodiment, line counter 42 actually is counting four picture elements ahead of the current picture element in the line due to the necessity for looking at the data contained within the "window" of the prior line printed or decoded. Randomly accessible memory 46 obtains input from the horizontal mode programmed logic array 40 and contains the data of the picture elements printed or decoded in the prior line. In conjunction with the address information contained in line counter 42 and address adjust module 44, the randomly accessible memory 46 by way of a line location programmed logic array 48, transmits the data contained within the "window" of picture elements on the prior line to shift register 50 to be supplied to the vertical mode programmed logic array 52 for use in determining vertical correlations. Address adjust module 44, since it is actually designed to be four picture elements ahead, subtracts four picture elements from the value contained in the line counter 42 as it is supplied to the line location program logic array 48. Horizontal mode supplies the proper information to the interface programmed logic array 36 to supply proper video data to the video data bus 30. The interface programmed logic array 36 provides the timing of data transfers to the video data bus 30 for the data supplied by the horizontal mode programmed logic array 40.

In a preferred embodiment, instruction register 32 is constructed of standard register components such as Model 74LS373 manufactured by Texas Instruments. Similarly, run length counter 32 is constructed from three standard commercially available counters such as Model 74LS193 manufactured by Texas Instruments. Interface programmed logic array 36 is constructed from a commercial programmed logic array Model PAL16R4 manufactured by Monolithic Memories. The particular structure contained within the programmed logic array may be had by reference to Table II which contains the equations used for the programmed logic array.

TABLE II

```
PAL16R4D2
PAT0001
DECODER INTERFACE PAL
CLK CTOL STL SC LRC LASTPEL CA1 CTFLG RESET GND ENABLE
LINEREADY GOODDATA GFHDLY ERRFFL LPFFL 3FF ACTIVE ENCLK VCC
/3FF := /SC*RESET + /SC*/3FF*/CA1 + SC*STL + /LPFFL*ACTIVE
/3FFDLY := RESET + /3FF + /LPFFL + LASTPEL*CA1*ACTIVE + SC
/LPFFL := /RESET*LASTPEL*CA1*ACTIVE + /RESET*/LPFFL
/ERRFFL := /SC*/LPFFL*ACTIVE*3FF + /SC*RESET*LPFFL*/LRC =
/ERRFFL*/SC*/LRC
/LINEREADY = /SC*/RESET + /LRC*SC
/ENCLK = /ACTIVE + /3FFDLY*/SC
/ACTIVE = /ERRFFL*/LPFFL + /STL + /CTFLG*3FFDLY*/CTOL*/SC +
/SC*RESET + /SC*/LPFFL*/CTOL*/CTFLG + /SC*/LPFFL*/3FF
/GOODDATA = /SC*/LINEREADY + /SC*/ERRFFL + /SC*LPFFL +
SC*/LRC + /SC*/3FF
``` programmed logic array 40 controls the color information supplied on the video data bus 30 and determines the proper horizontal run length operation and ASCII print timing. The vertical mode program logic array 52 determines the point in the current line being printed or decoded where a color change is necessary due to the color data of the picture elements contained in the "window" supplied by shift register 50 in conjunction with the 2D vertical correlated code supplied by the instruction register 32. The line location programmed logic array 48 keeps track of the particular location in which the decoder is operating on the current line and controls special beginning of line and end of line conditions and in particular, at an end of a line condition Dot Shift matrix 38 is a standard commercially available part such as Model 74LS165 manufactured by Texas Instruments. Horizontal programmed logic array 40 is also a commercially available programmed logic array and in a preferred embodiment a Model PAL16R6 manufactured by Monolithic Memories. The structure of the horizontal mode programmed logic array 40 can be had by reference to Table III which contains logic equations used for constructing that programmed logic array.

TABLE III

```
PAT16R6
PAT0001
HORIZONTAL MOD PAL.
CLK LDL 3FF D7 D6 D5 D4 STL SC GND ENABLE ACTIVE SDODLY
COUNTFLG HOLDFLG SHCLK STOPA COLOR DATA VCC
/COLOR := /SC*/LDL*COLOR*HOLDFLG*/D4 +
/SC*/LDL*/HOLDFLG*/COLOR*/D4 + /SC*LDL*/COLOR + SC*/DATA +
/SC*/LDL*COLOR*HOLDFLG*/D6 + SC*/LDL*/HOLDFLG*/COLOR*/D6
/STOPA := /SC*SDODLY*/SHCLK + /SC*ACTIVE*/STOPA + SC*/LDL +
SC*/STOPA*SDODLY + SC*/STOPA*HOLDFLG + SC*/STOPA*COUNTFLG +
/SHCLK*SC*/STOPA
/SHCLK := /SC*/D4 + /SC*LDL + SC*STOPA + SC*SHCLK +/SC*/D6
/HOLDFLG := /SC/LDL*D7*/D6 + /SC*/LDL*/D7*D6*D5 +
/SC*LDL*/HOLDFLG + SC*/STOPA*/3FF*/SHCLK*/HOLDFLG +
SC*/STOPA*/3FF*/HOLDFLG*SDODLY
+ SC*/STOPA*/3FF*HOLDFLG*SHCLK*/SDODLY
/COUNTFLG := /SC*LDL*/D6 + /SC*LDL*/COUNTFLG +
SC*/STOPA*/COUNTFLG + SC*/STOPA*SHCLK*/SDODLY*/HOLDFLG
/SDODLY := /SC*DLD + SC*/STOPA*/3FF*/SHCLK*/SDODLY +
SC*/STOPA*/3FF*SHCLK*SDODLY
```

Line counter 42 can be constructed of commerically available counter components such as Model 74LS193 manufactured by Texas Instruments. Address adjust module 44 is a standard commerically available PROM configured to subtract four from the data contained in the line counter 42. The PROM preferred for address adjust module 44 is Model 27SL9 manufactured by Advanced Micro Devices. Randomly accessible memory 46 is a commercially available 4K by 1 bit RAM such as a Model 2147 manufactured by Intel. Line location programmed logic array is a commercially available logic array such as Model PAL14H4 manufactured by Monolithic Memories. The particular structure of the line location programmed logic array 40 may be by reference to the equations contained in Table IV.

TABLE IV

PAL14H4D
PAT0001
LOGIC SIGNAL GENERATOR.
CA10 CA9 CA8 CA7 CA6 CA5 CA4 CA3 CA2 GND EXPANDI CAO ENOT
EXPANDO LASTPEL D A10 DN HP VCC
A10 = /CA10*/ENOT +
/CA9*/CA8*/CA7*/CA6*/CA5*/CA4*/CA3*/CA2*/ENOT + ENOT*/CA10
D = DN*EXPANDI + /HP*/EXPANDI
LASTPEL = CA6*CA7*CA9*CA10*CA0
EXPANDO = /CA6 + /CA7 + /CA9 + /CA10

Shift register 50 is a standard four bit commerically available shift register such as Model 74LS174 manufactured by Texas Instruments. Vertical mode programmed logic array 52 is a commercially available programmed logic array such as a PAL16R4 manufactured by Monolithic Memories. The particular structure of the vertical model program logic array can be had by reference to the equations contained in Table V.

TABLE V

PAL16R4D1
PAT0001
VERTICAL MODE PAL.
CLK HP0 HP1 HP2 HP3 3FFDL D2 D1 D0 GND ENABLE COLOR STOPB2L
TRANSL F-3L F-2L F-1L STOPB1L STOPA VCC
/STOPB1L = 3FFDL*/D0*/D1*/D2*/STOPA*COLOR*HP2*/HP3
+ 3FFDL*/D0*/D1*/D2*/STOPA*/COLOR*/HP2*HP3
+ 3FFDL*D0*/D1*/D2*/STOPA*COLOR*HP1*/HP2
+ 3FFDL*D0*/D1*/D2*/STOPA*/COLOR*/HP1*HP2
+·3FFDL*D1*/D0*/D2*/STOPA*COLOR*HP0*/HP1
+ 3FFDL*D1*/D0*/D2*/STOPA*/COLOR*/HP0*HP1
+ /3FFDL*D1*D0*/D2*/STOPA*/F-2L
/STOPB2L = 3FFDL*D0*/D1*/D2*/STOPA*COLOR*/HP0*/TRANSL
+ 3FFDL*D0*D1*/D2*/STOPA*/COLOR*HP0*/TRANSL
+ D2*/D0*/D1*/STOPA*/TRANSL*/F-1L
+ D2*D0*D1*/STOPA*/TRANSL*/F-2L
+ D2*D1*/D0*/STOPA*/TRANSL*/F-3L
+ 3FFDL*D0*D1*D2*/STOPA*/TRANSL*/COLOR*HP0
+ 3FFDL*D0*D1*D2*/STOPA*/TRANSL*COLOR*HP0
/TRANSL := D2*/STOPA*COLOR*HP0*/HP1 +
D2*/STOPA*/COLOR*/HP0*HF1 + D0*D1*/D2*/STOPA*COLOR*HP0 +
D0*D1*/D2*/STOPA*/COLOR*/HP0 + /STOPA*/TRANSL
/F-1L := /STOPA*/TRANSL*/HP0*COLOR*3FFDL +
/STOPA*/TRANSL*HP0*/COLOR*
3FFDL + /STOPA*/TRANSL*/F-1L*3FFDL
F-2L := /STOPA*/F-1L*3FFDL + /STOPA*/F-2L +
/STOPA*3FFDL*D0*D1*/D2
/F-3L := /STOPA*/F-2L + /STOPA*/F-3L wise require a great deal of hardware. The programmed digital computer also provides a great deal of flexibility to implement ASCII, self diagnostic or other modes with little or no increase in hardware cost. Further, the very repetitive and time critical conversion of intermediate code to video data format is accomplished by hardware. This unique construction gives the apparatus of the present invention the capability of being over twenty times faster than a pure software approach and gives a large size advantage over a pure hardware approach.

Thus, it can be seen that there has been shown and described a novel apparatus and method for converting facsimile coded data to video data in a process therefore. It is to be understood, however, that various changes, modifications, and substitutions in the form of the details of the described apparatus can be made by those skilled in the art without departing from the scope of the invention as defined by the following claims.

Thus, the apparatus of the present invention provides a unique multistep apparatus and process for converting facsimile coded data to video data. A programmed digital computer first converts the variable length facsimile coded data into a fixed length intermediate code and buffers the data so produced. A hardware module then converts the intermediate codes to video data for use in a printer to reconstruct the original document. The use of the programmed digital computer to find and convert the variable length facsimile coded data is an inexpensive use of standard microprocessor and related components to accomplish a task which would other-

```
        SUBTTL   SERIAL DATA DECODER
        NAM      SSDDP
*
*
******************************************************************
*AQUARIUS SERIAL DATA DECODER
*
*       AUTHOR:M.FEDDE
*
******************************************************************
*
*MAJOR SECTIONS INDEX
*
*
******************************************************************
*
*RESET-THIS ROUTINE IS THE RESET VECTOR OPERATIONS
*
*       -INITIALIZE THE PRINTER INTERFACE CONTROLLER
*       -CLEAR MEMORY(ZEROES OUT RAM EXCEPT FOR ERMAIL)
*        WAIT FOR 6850 INTERRUPT
*
*IRQ-FINDS WHETHER AN INTERRUPT IS A RECEIVE,TRANSMIT(ACIA)
*       OR LINE ERROR INTERRRUPT
*
*RECD-RECEIVE ACIA DATA INTERRUPT
*       -IF STRING (ASCII)
*               THEN INPUT STRING ROUTINE
*       -IF SELF TEST RECEIVED GO TO SELF TEST ROUTINE
*       -IF ILLEGAL CODE RECEIVED THEN IGNORE
*       -IF LEGAL THEN ECHO AND EXECUTE THE COMMAND
*
*ASCCC-SETS FLAG FOR NEXT BYTE IN STRING COMING
*
*SELFT-SETS SELF TEST FLAG
*
*CCSTR-PUTS CC ASCII CHARACTER COUNT IN MAILBOX(CMAIL)
*
*ISTRI-STACKS ASCII CHARACTERS RECEIVED FROM CC
*
*STLINE-KEEPS TRACK OF ASCII STRINGS
*
*STAT?-RETURNS ERROR COUNT TO CC WHEN REQUESTED
*
*STAT1-RETURNS OPERATION COMMAND TO CC WHEN REQUESTED
*
*ONESD-ENTRY POINT FOR 1D DECODING
*
*STDECO-COMMON SUBROUTINE USED BY ALL FAX MODES AT BEGINNING OF
*       CODING TO SETUP DMAC,INTERFACE CONTROLLER,AND
*       MAILBOXES
*
*DECODE-COMMON SUBROUTINE USED BY ALL FAX MODES TO
*       WAIT FOR 1ST BUFFER AND SETUP MISCELLANEOUS
*       MAILBOXES
*
*WHITE1-EXECUTES LOOKUP FOR 1 DIMENSIONAL FAX CODES.
*       IF A CODE IS FOUND IT IS STACKED FOR THE INTERFACE
*       CONTROLLER
*
*BLA1-  EXECUTES LOOKUP FOR 1 DIMENSIONAL BLACK CODES
*
*UNPACK-COMMON FAX SUBROUTINE;THIS SUBROUTINE UNPACKS
*       THE NUMBER OF BITS(SPECIFIED BY A REGISTER)
*       AND PLACES THE 8 BITS THAT ARE ON TOP OF THE STACK IN
*       THE B REGISTER
*
*POPZ,- UNPACK SUBROUTINE;IF A 64 BYTE BOUNDARY IS CROSSED,
*POPN   THE NEW 64 BYTE BUFFER IS BROUGHT UP WITH ONE OF THESE ROUTINES.
*
*WAIT-  COMMON FAX ROUTINE-IF NO BUFFER IS ABAILABLE, THE
```

```
*         THE WAIT1 ROUTINE IS STARTED (FROM POPZ,POPN).
*         THIS ROUTINE LOOKS FOR THE NEXT BUFFER TO BECOME ACTIVE
*         AS WELL AS SEARCHING FOR RTC IN THE DATA.
*
*ENDWT-   COMMON FAX ROUTINE; THIS CODE IS ENTERED WHEN RTC IS
*         FOUND IN THE DATA THE ROUTINE WAITS FOR PRINTER DATA TO
*         FINISH AND RETURNS TO IDLE.
*
*FIRQ-    HANDLES DMAC INTERRUPTS
*
*UPDMAI-COMMON FAX SUBROUTINE FOR KEEPING PRINTER DATA RUNNING
*         THIS IS INVOKED WHEN A 64 BYTE BUFFER IS STACKED FOR THE PRINTER.
*         DMAC IS STARTED IF IT IS NOT ALREADY ACTIVE.
*
*EOL1DW-ENTRY POINTS FOR EOL SUBROUTINE. (FOR 1D WHITE,1D BLACK,2D
*EOL1DB RESPECTIVELY).THIS CODE LOOKS FOR THE EOL IN THE DATA
*EOL2D  STREAM AND ACCUMULATES EOLS TO FIND THE RTC.
*
*N96CC-  STARTING POINT FOR 96CC,DIBIT,2D RESPECTIVELY
*DIBIT
*TWOSD
*
*WHIT12-IDENTICAL TO WHIT1 EXCEPT LOOKING FOR HUFFMAN CODES
*         WHILE RUNNING IN 2D
*
*BLA12-  LOOKS UP 1D BLACK CODES WHILE RUNNING IN 2D
*
*ONED2W-KEEPS TRACK OF TYPE OF EOLS WHEN RUNNING IN 2D
*ONED2B
*
*TWODEC-2D ROUTINE FOR VERTICAL,PASS,OR HORIZONTAL MODES
*         IN 2D. FOLLOWING THIS ARE THE ROUTINES TO STACK THE
*         PRINTER INSTRUCTIONS AND UNPACK THE PROPER NUMBER
*         OF BITS. (VZERO,VERT1,VERT2,VERT3,PASS,AND HORIZ)
*         NOTE THAT HORIZ USES WHIT12 AND BLA12 TO FIND THE ACTUAL
*         HUFFMANN CODES.
*
*ASCPRT-ENTRY POINT FOR ASCII. INTERFACE IS INITIALIZED AS WELL
*         AS MAILBOXES.
*
*PUTIN-STACKS BUFFER FOR DOT PATTERN GENERATION UNTIL 80 CHS
*         OR A CARRIAGER RETURN ENCOUNTERED.
*
*DOTPAT-GENERATES DESIRED DOT PATTERN FOR LINE OF CHARACTERS DESIRED.
*
*DPAK0,2,4,6-SINCE DOT PATTERNS FOR CHARACTERS CAN BE ON BYTE
*              BOUNDARIES OR HAVE 6,4,OR 2 UNUSED BITS, THE
*              DOTS ARE PACKED FOR THE OUTPUT BUFFER TO
*              ACCOMODATE THIS USING WHICHEVER ONE OF THES
*              PACKERS IS APPLICABLE.
*
*ZERSCP-ZEROES OUT SCAN LINE UNTIL LINE IS COMPLETED.
*ZERSCN
*STRDOT-DMAC IS INITIATED WITH THIS ROUTINE IN ASCII MODE.
*         TWO LINES ARE PUT OUT AT A TIME(SAME DATA)
*
*RELINE-FINDS NEXT BUFFER STRING OF ASCII CHARACTERS
*
*DIRTST-EXECUTES TEST PATTERN INSTRUCTED BY CC
*
****************************************************************
****************************************************************
****************************************************************
*$$$$$$$$$$$$$$$$$$$$$$$$$$$$$$$$$$$$$$$$$$$$$$$$$$$$$$$$$$$$$$
*
*
*TABLE DICTIONARY
*
*
*LU1L1W-TABLE CONTAINING LOOKUP FOR WHITE HUFFMANN CODES OF
*         LENGTH 8 BITS OR LESS. RUN LENGTH (PRINTER INTERFACE
```

```
*           CODES) ARE IN LEGAL HUFFMAN CODE POSITIONS AND FF
*           IN NON HUFFMANN CODE LOOKUPS.
*
*LU2L1W-AS ABOVE EXCEPT FOR HUFFMANN WHITE CODES OF LENGTH 9 BITS
*
*LU1L1B-AS ABOVE EXCEPT FOR HUFFMANN BLACK CODES OF <8,
*LU3L1B 12, AND 13 BITS RESPECTIVELY.
*LU4L1B
*
*LU1L2W-TABLE OF NUMBER OF BITS TO BE UNPACKED FOR THE HUFFMANN
*LU2L2W CODE FOUND. (FOR LOOKUP1 AND 2 RESPECTIVELY)
*
*LU1L2B-TABLE OF NUMBER OF BITS TO BE UNPACKED FOR LOOKUP1 BLACK
*
*
*ASCIDM-CONTAINS THE DOT PATTERN FOR ASCII CHARACTERS. ADDRESS
*          FOR THE DOT PATTERN IS GENERATED AS FOLLOWS:
*
*               =A0-A6=ASCII CHARACTER
*               =A7-A10=SCAN NUMBER-10
*               =A11-A15=ASCIDM RANGE
*
***************************************************************
*
*_____
*
*
*RAM DICTIONARY
*
*       THE RAM DICTIONARY CONSISTS OF THE TITLE OF THE RAM MEMORY,
*       LOCATION TITLE,WHERE IT IS USED,AND HOW IT IS USED
*
*BEGIN
*
*
*BUFX0-ASCII:BASE PTR FOR ASCII DOT BUFFER 0
*BUFX0M-ASCII:MAIL FOR BUFX0,FF=BUFX0 BEING OUTPUT TO DMAC
*BUFX1-ASCII:BASE PTR FOR ASCII DOT BUFFER 1
*BUFX1M-ASCII:MAIL FOR BUFX1
*
*CCMAIL-STRING:01=STRING IN PROGRESS,DO NOT ECHO
*CHARMM-ASCII:TEMPORARY HOLDING REGISTER FOR CHARACTER DOT LOOKUP
*         (ADDRESS OF DOT PATTERN)
*CHARMP-ASCII:LEAST SIGNIFICANT BYTE OF CHARMM
*CHDCT-ASCII:DEC TO ZERO FOR EACH SCAN LINE (INITIALIZED TO
*         CH COUNT FOR EACH SCAN)
*CHSTK-ASCII:BASE POINT FOR CHARACTER STRING FOR WHICH DOT PAT GENERATED
*CMAIL-STRING:TOTAL NO. BYTES IN STRING PRESENTLY BEING INPUT
*CNTDOT-ASCII:REGISTER FOR HOLDING NO. BYTES SO FAR IN STRING
*CNTRZZ-FAX:AT EOL BLACK,KEEPS TRACK OF NO.ZEROES IN RESZER
*COLOR-FAX:MAILBOX FOR COLOR OF PRESENT CODE
*CREGM-ALL:MIRROR OF CONTENTS IN CREG;ALWAYS UPDATED WITH CREG
*CTSTRM-STRING:CONTAINS NO. BYTES INPUT SO FAR
*
*
*DOTCH-ASCII:CONTAINS ADDRESS OF CHARACTER FOR WHICH DOT PATTERN GEN
*DOTCHL-ASCII:LS BYTE OF DOTCH
*
*
*ENDFLG-ASCII:THIS IS SET TO FF IF LSTFLG SET AND LAST LINE OF INPUT
*         CHARACTERS STACKED
*ERRSTK-FAX:USED IN INCERR TO DETERMINE IF ERR CT IS INCREMENTED
*ERMAIL-FAX:USED TO ACCUMULATE ERROR COUNT IN FAX MODES
*ESTRC0-7-FAX:MAILBOX FOR EACH OF 8 CM DATA IN BUFF AREAS
*         (SEE ETRCPC)
*ESTRCP-FAX:PTR TO MAILBOX FOR CM BUFFER PRESENTLY BEING DECODED
*ESTRI0-7-FAX:MAILBOX FOR EACH OF 8 I/F STRINGS IN BUFF
*         (SEE ETRIPC)
*ESTRIP-FAX:PTR TO ACTIVE BUFFER BEING STACKED(UPDMAI)
*ESTRPP-FAX:PTR TO ACTIVE CM BUFFER BEING DECODED
*ETRCPC-FAX:PTR USED IN FIRQ TO POINT AT MAILBOX FOR BUF BEING INPUT
*         (FF=FULL)FROM CM
```

```
*ETRIPC-FAX:PTR USED IN FIRQ TO POINT AT MAILBOX BEING OUTPUT
*        (FF-FULL;7F-ODD SIZE BUFFER;0F-OUTPUT ACTIVE;0-EMPTY)
*
*
*FIRQT1-FAX:TEMP HOLD MEMORY FOR D DURING FIRQ
*
*
*LSTFLG-ASCII:WHEN END ASCII CODE RECEIVED;THIS FLAG SET TO FF
*
*
*MAILEN-FAX:CONTAINS STATUS OF CM SYNC AT WAIT TIME
*MAILOP-ALL:CONTAINS CODE OF PRESENT OPERATION
*MAILPO-ALL:AS ABOVE EXCEPT 2 BYTES
*MAILST-IRQ:MEMORY FOR SEQUENCING STAT?(=01-RETURN ERROR COUNT)
*MCM-FAX:BASE ADDRESS FOR CM DATA BEING DECODED
*MCMCT-FAX:COUNT FO BYTES IN PRESENT BUFFER BEING DECODED(0-64)
*MIF-FAX:BASE ADDR FOR INSTR'S BEING STACKED FOR I/F
*MIFCT-FAX:COUNT OF BYTES IN PRESENT I/F BUFFER BEING STACKED
*
*NETFLG-FAX;FF=NETWORK DECODE IN PROGRESS,00-NORMAL FAX
*
*RES-FAX,ASCII:CONTAINS RESIDUE OF PARTIAL BYTE FOR STACKING
*RESCT-FAX,ASCII:NO. BITS IN RES
*
*STARTA-ASCII;MAILBOX FOR DMASTART,FF=SART;0-NOT
*
*STK1-4-ASCCII,STRING:MAILBOX FOR CC STRING(FF=FULL,0=EMPTY)
*STKCT1-4-ASCII,STRING:STRING COUNT FOR EACH OF 4 CC INPUT BUFS
*STKPT1-4-ASCII,STRING:BASE PTR FOR EACH OF 4 CH BUFFS FROM CC
*STKPTA-STRING:PRESENT ACTIVE STRING BUFFER BEING INPUT TO
*STMAIL-STRING:MAILBOX FOR STRING SEQUENCE-01=NEXT BYTE IS COUNT
*STRC0-7-FAX:BASE POINTER FOR CM DATA TO SDP(8 BUF'S-64 BYTES)
*STRI0-7-FAX:BASE POINTER FOR I/F INSTS (8 BUF'S-64 BYTES)
*STRKEP-STRING:TEMP HOLDING REG IN INPUT STRING
*
*
*TCNT-FAX 2D:NO. TERMINATE COUNTS STACKED FOR 2D SUBROUTINE
*TEMP1
*TEMP2
*TEMP3-FAX,CONTAINS UNPACK COUNT(TEMPORARY)
*TEMP4P-ASCII-CONTAINS CHARACTER COUNT FOR SCANNING
*TEMP4-ASCII:USED AS HOLD REG FOR SCAN CH CT
*TEMP5-ASCII:USED AS HOLD REG FOR SCAN CHARACTER BASE POINTER
*TEMP6-FAX,2D:STATUS-1D(00),2D SUBROUTINE(FF)
*TEMP7-ASCII:USED AS HOLD REG FOR CH  BASE PT.
*       -FAX:CONTAINS EOL COUNT
*TEMP8
*TEMP9
*TEMP10-ASCII:USED AS CH CTR WHEN STACKING LINE OF CH'S
*TEMP11-FAX:IN EOL ROUTINE(COUNTS NO. OF SEQUENTIAL EOL'S)
*TEMP12-FAX:IN EOL COUNTS NO. BITS USED IN A CM BYTE
*TEMP13-FAX:TEMP REG (AT WAIT)-HOLDS LAST DMAC BYTE COUNT
*TEMP14-FAX:ZERO COUNT IN EOL
*TEMP15-FAX:FLAG FOR BUF BOUND IN LUKEOL=FF IS BUF PASSED
*TESTNO-TEST:CONTAINS NO. FOR TEST TO BE RUN
*
*
*TMAIL-STRING: CONTAINS STRING TYPE(0-ASCII,2-SELFTEST,4-DIRTST)
*
*
*UPDMAT-FAX:TEMPORARY REGISTER FOR D WHILE CHANGING BUFFER AREAS FOR I STRS
*
*
*WTMAIL-ASCII:SET TO FF WHEN ALL 4 BUFFERS FULL AND ASCII STR PENDING
*
*
*ZEROCT-FAX:EOL-CONTAINS NO. ZEROES IN A ROW
*
*
****************************************************************
*
*
```

```
            ORG     $FFF0
            FDB     MON,MON,MON,FIRQ,IRQ,SWI,RESETP,RESETP
*           *THESE ARE THE INTERRUPT VECTORS
*           *MON IS SWI VECTOR (IDLE),FIRQ IS FIRQ VECTOR,IRQ IS IRQ VECTOR
*           *RESET IS RESET VECTOR
*           *
*           *FOLLOWING IS RESET ROUTINE-RESET
*           *THE INTERFACE CONTROLLER IS CLEARED
*           *
            ORG     $E000
*           *
MON         BRA     RESET
RESETP      LDA     $03

STA     ACIC
RESET       CLR     DMAP
            ORCC    $FF         DISABLE INTERRUPTS
            LDB     $60         NSTART,NENBUS,DIS CONT,LRC,NSC,NCM
            STB     CREG        *CONFIGURE CONTROL REGISTER
            LDA     $58
            STA     CONT        *RESET INTERFACE CONTROLER
            LDB     $64         NSTART,NENBUS,DIS CONT,LRC,NSC,NCM
            STB     CREG        THIS CLEARS IRQ
            STB     CREGM
*           *
*           *FOLLOWING ARE THE PERIPHERAL CONT REGS
CREG        EQU     $A000       *CONTROL REGISTER
CONT        EQU     $8000       *INTERFACE CONTROLER
ACID        EQU     $D001       *ACIA REG DATA
ACIC        EQU     $D000       *ACIA REG CONTROL
CMSYNC      EQU     $9000       *CM SYNC READ D0
DMAC0       EQU     $B010
DMAC1       EQU     $B011
DMAP        EQU     $B014
DMAI        EQU     $B015
DMADC       EQU     $B016
DMAAH0      EQU     $B000
DMAAL0      EQU     $B001
DMABH0      EQU     $B002
DMABL0      EQU     $B003
DMAAH1      EQU     $B004
DMAAL1      EQU     $B005
DMABH1      EQU     $B006
DMABL1      EQU     $B007
*           *
*           *THESE ARE THE CONTROL REG ADDRESSES
*           *
*
*FOLLOWING IS THE RAM ALLOCATIONS
*
*
CREGM       EQU     $0100
STATM       EQU     $0102
CCMAIL      EQU     $0104
TMAIL       EQU     $0106
STMAIL      EQU     $0108
CMAIL       EQU     $010A
MAILST      EQU     $010E
ERMAIL      EQU     $0110
COLOR       EQU     $0112
MAILOP      EQU     $0114
*
ESTRC0      EQU     $0140
ESTRC1      EQU     $0141
ESTRC2      EQU     $0142
ESTRC3      EQU     $0143
ESTRC4      EQU     $0144
ESTRC5      EQU     $0145
ESTRC6      EQU     $0146
ESTRC7      EQU     $0147
*
```

```
ESTRI0    EQU    $0120
ESTRI1    EQU    $0121
ESTRI2    EQU    $0122
ESTRI3    EQU    $0123
ESTRI4    EQU    $0124
ESTRI5    EQU    $0125
ESTRI6    EQU    $0126
ESTRI7    EQU    $0127
*
ESTRCP    EQU    $0148
ESTRPP    EQU    $0149
ESTRIP    EQU    $0150
ETRCPC    EQU    $0152
ETRIPC    EQU    $0154
MIF       EQU    $0156
MIFCT     EQU    $0158
MCMCT     EQU    $015A
MCM       EQU    $015B
*
CNTDOT    EQU    $018C
LSTFLG    EQU    $018E
STRKEP    EQU    $0192
STKPTA    EQU    $0194
WTMAIL    EQU    $0196
CTSTRM    EQU    $0198
MAILEN    EQU    $019A
UPDMAT    EQU    $019B
TCNT      EQU    $019D
ENDFLG    EQU    $019E
STARTA    EQU    $0200
*
SCAN      EQU    $0202
CHDCT     EQU    $0204
CHARMM    EQU    $0206
CHARMP    EQU    $0207
MAILPO    EQU    $0208
ERRSTK    EQU    $020A
ZEROCT    EQU    $020C
RESZER    EQU    $020E
RAMHLD    EQU    $0220
RAMHLP    EQU    $0221
RAMKEP    EQU    $0222
*
NETFLG    EQU    $0224
*
RES       EQU    $015E
RESCT     EQU    $0160
TEMP1     EQU    $0161
TEMP2     EQU    $0162
TEMP3     EQU    $0163
TEMP4     EQU    $0164
TEMP4P    EQU    $0165
TEMP5     EQU    $0165
TEMP6     EQU    $0166
TEMP7     EQU    $0167
TEMP8     EQU    $0168
TEMP9     EQU    $0169
TEMP10    EQU    $016A
TEMP11    EQU    $016B
TEMP12    EQU    $016C
TEMP13    EQU    $016D
TEMP14    EQU    $016E
TEMP15    EQU    $016F
*
FIRQT1    EQU    $0170
STKCT1    EQU    $017A
STKCT2    EQU    $017B
STKCT3    EQU    $017C
STKCT4    EQU    $017D
STK1      EQU    $0180
STK2      EQU    $0181
STK3      EQU    $0182
```

```
STK4      EQU      $0183
CHSTK     EQU      $0280    ********************************
*
BUFX0M    EQU      $0186
BUFX1M    EQU      $0188
DOTCH     EQU      $018A
DOTCHL    EQU      $018B
*
TESTNO    EQU      $0300
DTMAIL    EQU      $0301
MEMTST    EQU      $0302
CNTRZZ    EQU      $0304
*BUFX0    AT 300-37F
*BUFX1    AT 380-3FF
*
*STRC0-7 AT 400-5FF
*STRI0-7 AT 600-7FF
*
**         *
*          *
*          *THIS ROUTINE ZEROS OUT RAM;0000-07FF
*          *
          LDX      $07FF
          LDA      $00
          LDU      ERMAIL
OZERO     STA      X
          LEAX     -1,X
          BNE      OZERO
          STU      ERMAIL
          LBRA     IDLE     *END OF RESET
*          *
*          ****************************************************************
*          *
*         *IDLE MODE
*         *6850 IS CONFIGURED
*         *FIRQ DISABLED
*          *
IDLE      LDS      $007F
          LDA      $9C
*         */1,8 BITS ODD+1,TI DISABLED ,RI ENABLED-6850
          STA      ACIC
CWAID     CWAI     $EF      *WAIT FOR RX DATA
          BRA      CWAID
ASCT      LBRA     RESET
*          *
*         *END OF IDLE
*          *
*         *INTERRUPT ROUTINE
*         *TEST RDRF
*         *TEST TDRE
*         *TEST ERROR
IRQ       LDA      ACIC
          BITA     $80      TEST FOR 6850 INTERRUPT
          LBEQ     PERR
          BITA     $01      *TEST FOR RECIEVER INTTERUPT
          BNE      RECD
          LBRA     TXST
*          *
*         *IF NO ACIA INTERRUPT;THEN OVER/UNDERRUN ERROR
*          *
          LDA      CREGM
          TFR      A,B      *A-B
          ORB      $04
          STB      CREG     *CLEAR INTERRUPT
          STA      CREG
          LDD      STATM
          ADDD     $0001
          STD      STATM    *INCREMENT ERROR COUNT
          RTI
*          *
*         *DATA IS RECIEVED.THIS DATA IS ECHOED BACK
```

```
*               *IF ILLEGAL;THEN IGNORED
*               *
*               *
RECD    LDA ACID
        LBEQ    STATUS
*               *TEST FOR ASCII CC OR DIAGNOSTIC MODE
*               *UNDER WAY
        LDB     CCMAIL    *CC MAIL WHEN BIT 0 SET MEANS STRING INPUT ACTIVE
        CMPB    $01
        LBEQ    CCSTR     *GO TO CC STRING IF EQUAL
        LDB     DTMAIL    TESTING FOR SELF TEST
        CMPB    $02       AN 02 IS PUT THERE IN SELFT
        BEQ     DTLOAD    UNCONDITIONAL BR FOR STARTING TEST
        CMPA    $07
        BNE     NEXIRQ
        LDU     MAILPO    GET PRESENT OPERATION CODE
        CMPU    $0007
        LBEQ    ASCAKT
NEXIRQ  LDB     $BC       ENABLE TX INT-NO CHANGE OTHERWISE
        STB     ACIC
        CMPA    $0A       TEST FOR STATUS MODES OR END ASCII CODES
        BGE     OPENP
OPEN    STA     ACID
OPENP   TFR     A,B                A-B
        CMPB    $0E       *TEST FOR ILLEGAL
        BLT     GOOD
        RTI
GOOD    TFR     A,B
        ASLB
        LDU     HERE
        LDX     B,U
        JMP     0,X       JUMPS TO SELECTED
HERE    FDB     RESET,RESET,ONESD,DIBIT,N9600,TWOSD,ASCT,ASCCC,SELFT,RESET
        FDB     ENDASC,STAT1,STAT2,RESET
ZERO    EQU     $00
*               *
*               *
*               *THIS ROUTINE INPUTS A STRING OF ASCII CHARACTERS
*               *FOR PRINTING.WHEN    CHARS=COUNT THEN GO TO ROUTINE
*               *FOR CC ASCII STRING
*               *CCMAIL-STRING IN PROGRESS
*               *STMAIL-01=NEXT RX=BYTE COUNT
*               *TMAIL-CONTAINS STRING TYPE(0-ASC,2-SLFTST,4-DIRTST)
*               *
ASCCC   LDA     $01
        STA     CCMAIL    *SET MAILBOX TO SIGNIFY STRING IN PROGRESS
        STA     STMAIL    *STMAIL WHEN LOADED WITH 01 MEANS NEXT RX BYTE
        LDD     $0000
        STD     TMAIL
        RTI
*               *
*               *SELFT-SELF TEST NOT IMPLEMENTED BUT STRING IMPLEMENTED
*               *
SELFT   LDA     $00       CHANGED FROM 01 BY GMG 9 20 80
        STA     CCMAIL
        STA     STMAIL
        LDA     $02       AN ARBITRARY   FOR SELFTEST
        STA     DTMAIL
        LDD     $0000     CHANGED FROM 0002 BY GMG 9 20-80
        STD     TMAIL
        RTI
*               *SELF-TEST FOR LOADING TEST NUMBER _BRANCHING
DTLOAD  CLR     DTMAIL    CLEAR MAILBOX SO SEQ WORKS
        STA     TESTNO
        LBRA    DIRTST
*               *
*               *CSTST-DIRECTED SELF TEST NOT IMPLEMENTED BUT STRING IMPLEMENTED
*               *
*               *THIS SEQUENCE FINDS THE BYTE COUNT AND THEN PLACES
*               *IN BUFFER.THESE BYTES ARE USED BY THE SUBSEQUENT ROUTINE AT COMPLETION
*               *OF STRING INPUT
*               *
```

```
CCSTR     LDB     $01
          CMPB    STMAIL    *TEST FOR START
          BNE     ISTRI
          STA     CMAIL     *COUNT TO COUNT MAILBOX
          BEQ     STRET
          LDB     $02
          STB     STMAIL
          TFR     A,B       *A-B
          LDA     $00
          STD     CTSTRM    CTSTRM CONTAINS COUNT
          RTI
*         *
*         *
*         *PROCEDURE STACK ASCII BUFFER
*         *INPUTS:
*         *CTSTRM-CONTAINS BYTES INPUT SO FAR
*         *CMAIL-TOTAL BYTES IN STRING
*         *STKPT1,2,3,4-0400,0500,0600,0700-BASE PT FOR EA OF 4 STACKS
*         *STKPTA-PRESENT ACTIVE STACK PTR
*         *STK1,2,3,4-FF=ASCII STACK FULL;00=EMPTY
*         *STKCT1,2,3,4-GIVES TOTAL COUNT FOR EA OF 4 STACKS
*         *************************************************************
*         *
ISTRI     LDB     STMAIL
          CMPB    $02       TEST FOR FIRST CH IN STRING
          LBEQ    STLINE
NOWSTR    STA     [STKPTA]  CHARACTER TO STACK
          LDD     STKPTA
          ADDD    $0001
          STD     STKPTA
*         *INCREMENT STACK POINTER
          INC     CTSTRM
          LDA     CTSTRM
          CMPA    CMAIL     TEST FOR LAST CHARACTER
          LBEQ    FULSTK
*         *END OF STRING-UPDATE PARAMETERS
          RTI
*****************************************************************
*PROCEDURE START STRING
*INPUTS:
*CTSTRM
*STKPTA-PTR OF PREVIOUS STRING
*STKPT1,2,3,4
*U
*****************************************************************
STLINE    STA     STRKEP
          CLR     STMAIL
          LDU     MAILPO
          CMPU    $0007     TEST ASCII PRINTING ACTIVE
          BEQ     ASTRIP
ARESTK    LDD     STKPT1    FIRST BUFFER SET UP
          STD     STKPTA
          LDA     STRKEP
          BRA     NOWSTR
*         *
*         *
STRET     CLR     STMAIL
          RTI
*         *
ASTRIP    LDA     STRKEP
          LDD     STKPTA
          CLRB
          CMPD    STKPT1    TEST FOR LAST BUF EQUAL STKPT1
          LBEQ    NOWST2
          CMPD    STKPT2
          LBEQ    NOWST3
          CMPD    STKPT3
          LBEQ    NOWST4
          LBRA    ARESTK
****
NOWST2    LDD     STKPT2
```

```
                STD     STKPTA
                LDA     STRKEP    SETUP BUFFER 2
                LBRA    NOWSTR
        *********
        NOWST3  LDD     STKPT3    SETUP BUFFER 3
                STD     STKPTA
                LDA     STRKEP

LBRA    NOWSTR
        *********
        NOWST4  LDD     STKPT4
                STD     STKPTA
                LDA     STRKEP
                LBRA    NOWSTR    SETUP BUFFER 4
***************************************************************
*
*PROCEDURE FULSTK
*THIS PROGRAM UPDATES STRING MAILBOXES
*       -STK1,2,3,OR 4 ARE LOADED WITH FF
*       -STKCT1,2,3,OR 4 ARE LOADED WITH BUFFER LENGTH
*       -CCMAIL IS CLEARED
*INPUTS
*       -CMAIL= BYTES
*       -STKPTA
*       (PTR FOR ADDRESSING)
*
***************************************************************
FULSTK  CLR  CCMAIL
        LDD  STKPTA
        CLRB
        CMPD    STKPT1
        LBEQ    ENDST1
        CMPD    STKPT2
        LBEQ    ENDST2
        CMPD    STKPT3
        LBEQ    ENDST3
        LDA     CMAIL     GET NO. OF BYTES
        STA     STKCT4    LOAD STACK CT4 MAILBOX
        LDA     $FF
        STA     STK4      LOAD STACK FULL MAILBOX (4)
        LBRA    ENDSIT
***************************************************************
ENDST1  LDA  CMAIL
        STA     STKCT1
*       *STACK COUNT MAILBOX LOADED
        LDA  $FF
        STA     STK1      STACK FULL MAILBOX (1)
        LBRA    ENDSIT
***************************************************************
ENDST2  LDA     CMAIL
        STA     STKCT2    STACK COUNT MAILBOX (2)
        LDA     $FF
        STA     STK2      STACK  FULL MAILBOX
        LBRA    ENDSIT
***************************************************************
ENDST3  LDA     CMAIL
        STA     STKCT3    STACK COUNT MAILBOX (3)
        LDA     $FF
        STA     STK3      STACK FULL MAILBOX
        BRA     ENDSIT
***************************************************************
*
*PROCEDURE ENDSIT
*       IF IN ASCII MODE THE PROGRAM RETURNS FROM INTERRUPT
*       OTHERWISE GO TO SELECTED MODE
*-
*************************************
```

```
ENDSIT  LDU     MAILPO
        CMPU    $0007       TEST FOR ASCII
        LBEQ    ENDRET
        LDX     TMAIL
        JMP     [HPLUS,X]       GO TO ACTIVATED ROUTINE
HPLUS   FDB     ASCPRT,SLFTST,DIRTST
*
ENDRET  RTI
*************************************************************
*PROCEDURE ASCAKT
*       TEST FOR AVAILABLE STACKS OF CHARACTERS
*       IF ALL FULL PLACE FF IN WTMAIL TO PREVENT ECHO ON
*       CC INTERFACE
*************************************************************
ASCAKT  LDB     STK1        TEST FOR STK1 AVAILABLE
        LBEQ    OPEN
        LDB     STK2        TEST FOR STK2 AVAILABLE
        LBEQ    OPEN
        LDB     STK3        TEST FOR STK3 AVAILABLE
        LBEQ    OPEN
        LDB     STK4        TEST FOR STK4 AVAILABLE
        LBEQ    OPEN
        LDB     $FF
        STB     WTMAIL      SETUP FOR WAIT ON RETURN OF ECHO
        LBRA    OPENP
*************************************************************
SLFTST  LBRA    IDLE        *THIS IS NOT IMPLEMENTED
*       *
*       *
*       *
*       *
*       *NOTE THAT STATUS IS NOT USED AND THIS IS KEPT IN CASE CC IS
*       *CHANGED AGAIN OR AGAIN OR AGAIN
*STAT1  RETURNS THE OPERATION MODE TO THE CC WHEN ASKED
STAT1   LDA     MAILOP
        STA     ACID
        RTI
*
*STAT2  RETURNS ERROR COUNT TO CC WHEN REQUESTED
*
STAT2   LDA     ERMAIL
        STA     ACID
        CLR     ERMAIL
        RTI
STATUS  LDA     $BC         *THIS ROUTINE INITIATES STATUS
        LDB     $01
        STB     MAILST          *MAILST IS MEMORY FOR SEQUENCING STATUS ROUTINE
        STA     ACIC        *ENABLE RX,TX INTERRUPTS
        LDA     MAILOP      *FETCA OPERATION MAILBOX
        STA     ACID
        RTI
*       *
*       *ERMAIL TX IS CAUSED BY TX INTERRUPT AND ERMAIL SET-RECEIVE CC
TXST    LDA     MAILST
        BEQ     TXRET       IF MAILST=0,RETURN AND CLR TX INTERRUPT
        LDA     ERMAIL      *GET ERRCT
        LDB     $00
        STA     ACID
        STB     ERMAIL      *CLR ERRCT
        STB     MAILST      *CLR MAILST
TXRET   LDB     $9C
        STB     ACIC        DISABLE TX INT
        RTI
*************************************************************
*       *
*       *THIS ROUTINE ACCUMULATES ERROR COUNT
*       *
*       *
PERR    LDA     CREGM       THIS SEQUENCE CLEARS THE I/F INT
        ORA     $04         SET THE LINE READY BIT
        STA     CREG
        LDA     CREGM       THIS INTERRUPT SHOULD NOT OCCUR IN ASCII MODE
        STA     CREG
```

```
                LDA     ERMAIL
                CMPA    $FF
                BEQ     IGNORE    *TEST FOR MAX ERR CT
                INC     ERMAIL
IGNORE  RTI
*       *
*       *
*       *
******************************************************************
*ALL ROUTINES PLACE OPERATION CODE IN MAILOP
*
*ONESD,DIBIT,N9600;ALL USE THE SAME ROUTINE. DECISION POINTS
*IN THE PROGRAM TAKE CARE OF THE DIFFERENCES.
*MAILOP=02;1D,03;DIBIT,04;9600
*IN THIIS OPERATION THE DMAC IS USED TO BUFFER MESSAGES.
*FROM THE CM. AT THE START THE DMAC PORT 0 IS ENABLED
*FOR 64 BYTES FROM CM. THE PROCESSOR WAITS AT ODBC FOR THE
*END OF BUFFER. AT THIS POINT A NEW BUFFER IS STARTED. THE
*DECODE ROUTINE DECODES THIS STRING. THE CM DATA IS CONVERTED
*INTO A SERIES OF INSTRUCTIONS FOR THE INTERFACE CONTROLLER.
*AS 64 INSTRUCTIONS ARE DECODED WE PLACE THEM INTO A BUFFER FOR THE
*DMAC TO MOVE TO THE INTERFACE CONTROLLER.
*
*SPECIAL SITUATIONS ARISE WHEN USING THE DMAC.FOLLOWING IS
*A LIST OF THESE SITUATIONS AND THE METHOD USED TO HANDLE THEM
*FOLLOWS:
*         -COM MOD DATA IS OVERRUN; WHEN THIS OCCURS, PROGRAM GOES TO ODBC
*          AND WAITS FOR THE NEXT BUFFER TO FINISH. WHEN FINISHED PROGRAM
*          RETURNS TO DECODE. WHEN DMAC FIRQ OCCURS WHEN ODBC;WE MUST
*          HANDLE THIS AND RETURN TO ODBC.
*
*         -INSTS ARE OVERRUN;THIS IS DETECTD BY DMAC1 INACTIVE AND
*          NO BUFFERS COMPLETE. THE DECODE ROUTINE HANDLES THIS BY
*          INITIATING THE DMAC WHEN A BUFFER DOES FILL. NOTE THAT DMAC1
*          CAN BE CONTROLLED EITHER BY FIRQ ROUTINE OR DECODE ROUTINE.
*          DMAC0 IS CONTROLLED BY FIRQ ALWAYS EXCEPT AT PROGRAM
*          INITIATION.
*
*INITIATE ONESD
*SETUP DMAC0,SET CMSYNC,SET COLOR=WHITE,CLR DMAC0 MAILBOXES,LD MAIL
*ZERO TO ERROR COUNT(ERMAIL)
*LOAD ENGINE TO FORCE LINE READY AND NOT GOOD DATA
******************************************************************
ONESD   LDA     $02
        CLR     ERMAIL    ZERO TO ERROR COUNT
        STA     MAILOP    1D CODE TO STATUS MAIL
        CLR     COLOR     C=WHITE
        LDU     $0002
        STU     MAILP0
        LBSR    STDECO
        LBSR    DECODE
        LBRA    WHITE1
******************************************************************
*PROCEDURE STARTDECO
*       DMAC IS SETUP
*       ENGINE IS SETUP
*       CM SYNC IS ACTIVATED
*
*       THIS ROUTINE IS USED AT THE START OF 1D,2D,DIBIT MODES.
*       THE DMAC AND VARIOUS MAILBOXES ARE SETUP.
*-THIS A SUBROUTINE
******************************************************************
*
*THIS CODE STARTS THE INTERFACE CONTROLLER BY
*       -RESET TO INTERFACE CONTROLLER (58)
*       -6C TO CR=START,NBUS,START I/F,LRC,NSC,NCM
*       -RESET TO I/F
*       -49 TO CR=NSTART,BUS,EN If,NLRC,NSC,CM(09STARTS CM)
******************************************************************
STDECO  LDD     $587C   NSTART,NENBUS,STARTC,LRC,NSC,NCM
        STA     CONT
```

```
        STB     CREG        6C TO CR
        STA     CONT        RESET
        LDD     $0949       09 CONTAINS START
        STD     CREG        49 TO CR
        STB     CREGM       NSTART,ENBUS,ENABLEC,NLR,NSC,CM
        CLR     DMAP
        LDD     DMAC0       THIS CLEARS LATENT FIRQ FROM DMAC
        LDA     $04         WRITE TSC TO DMA
        STA     DMAC0
        LDD     $0400
        STD     DMAAH0      FIRST DMA ADDRESS=0400
        STD     MCM
        LDD     $00040
        STD     DMABH0      DMA BYTE COUNT=64
        LDA     $03
        STA     DMAI        ENABLE INT ON CHS 0 AND 1
        CLR     DMABL1
        CLR     DMADC       CLEAR=2 CHANNEL MODE
        LDA     $01
        STA     DMAP        ENABLE CHANNEL 0
        LDA     $00
        STA     ESTRC1
        STA     ESTRC2
        STA     ESTRC3
        STA     ESTRC4
        STA     ESTRC5
        STA     ESTRC6
        STA     ESTRC7
        STA     ESTRC0
        STA     ESTRI0
        STA     ESTRI1
        STA     ESTRI2
        STA     ESTRI3
        STA     ESTRI4
        STA     ESTRI5
        STA     ESTRI6
        STA     ESTRI7
        STA     ERMAIL      ERROR COUNT TO 0
        RTS
*****************************************************************
*THE ESTRCN AND ESTRIN ARE MAILBOXES FOR BUFFER ACTIVE
*(C=CM BUF,I=INST BUF)
*0 MEANS THE BUFFER IS INACTIVE,FF MEANS THE BUFFER IS FULL
*****************************************************************
*MAILEN CONTAINS THE STATUS OF CM SYNC AT
*                           WAIT TIME
DECODE  LDD     ESTRC0
        STD     ESTRCP      LOAD END POINTER WITH 1ST BUF AREA
        STD     ETRCPC
        LDD     ESTRI0
        STD     ESTRIP      LOAD I END PTR W 1ST BUFFER AREA
        STD     ETRIPC
*
*ESTRCP CONTAINS ADRR OF MAILBOX FOR CM BUF BEING DECODED
*ESTRIP CONTAINS  ADDR MAIL FOR BUF BEING STACKED
*
STRC0   EQU     $0400       BASE PT FOR CM BUF0
STRC1   EQU     $0440                           1
STRC2   EQU     $0480                           2
STRC3   EQU     $04C0                           3
STRC4   EQU     $0500                           4
STRC5   EQU     $0540                           5
STRC6   EQU     $0580                           6
STRC7   EQU     $05C0                           7
*
STRI0   EQU     $0600       BASE PT FOR IF BUF 0
STRI1   EQU     $0640                           1
STRI2   EQU     $0680                           2
STRI3   EQU     $06C0                           3
STRI4   EQU     $0700                           4
STRI5   EQU     $0740                           5
STRI6   EQU     $0780                           6
```

```
STRI7     EQU       $07C0                      7
*****************************************************************
*AT START COM DATA IS NOT STACKED-THEREFORE WE MUST WAIT FOR
*64 BYTES.
*AT START INST DATA BUFFER IS NOT ACTIVE;THEREFORE AFTER
*64 INSTRUCTIONS DECODED; THE DMAC IS STARTED TO LOAD THE INTER FACE CONTROLLER
*UNPACK ROUTINE DECIDES WHEN TO GO TO WAIT ROUTINE(FOR MORE CM DATA)
*CONDITION=RESIDUE CT=0;END OF CM STACK REACHED.
*MIFCT=CT OF I IN PRES STACK
*MCMCT=CT OF CM BYTES  IN PRESENT STACK
*X CONTAINS THE ADDRESS OF DECODED CM BYTE PRESENTLY TOP OF STACK
*Y CONTAINS THE ADDRESS OF ENCODED I/F INST AT OTP OF STACK
*MCM CONTAINS BASE PT OF ACTIVE STRING BEING DECODED
*MIF CONTAINS BASE POINT OF STACK OF INSTS BEING ENCODED FOR I/F
*MCMPL POINTS AT BEGINNING OF BUFFER (CM)-DMAC
*MIFMI POINTS POINTS AT BASE OF ACTIVE DMAC BUFFER
*
*
          ORCC      $10       DISABLE FIRQ
          ANDCC     $AF       ENABLE IRQ
NODICE    LDA       ESTRC0    TEST FOR 1ST CM BUF FULL
          BEQ       NODICE
          LDD       $0400
          STD       MCM       0400-TOP OF CM STACK
          LDX       $0400
          LDY       $0600
          STY       MIF       SET UP INSTRUCTION STRINF PTR
          LDB       64
          STB       MIFCT
          STB       MCMCT
********************************************
*AT THIS POINT THE DECODE BEGINS
********************************************
          LDB       X
          LEAX      +1,X      B CONTAINS TOP OF STACK
          DEC       MCMCT
          LDA       X         FIRST RESIDUE
          STA       RES
          LDA       $08       RESIDUE CT=8
          STA       RESCT
          RTS                 EXECUTE THE DECODE
*****************************************************************
*AT THIS POINT WE BEGIN 1D DECODE
*         -B CONTAINS TOP OF CM STACK,RES-NEXT BYTE
*         RESCT CONTAINS SIZE OF RESIDUE LEFT
*****************************************************************
*THIS PROGRAM OPERATES AS FOLLOWS
*         -WHITE USES B TO INDEX LOOKUP 1
*           IF CODE CONTAINED HERE THE CODE IS PLACED ON THE I/F STACK
*           AND THE PROPER NO. BITS IS UNPACKED FROM CM DATA
*           IF NO CODE ON 1ST TRY WE UNPACK 1 BIT AND DO LOOKUP 2
*           IF FOUND THE CODE IS PLACED ON THE STACK AS ABOVE
*           IF NO CODE IS FOUND WE GO TO EOL ROUTINE
*
*         -BLACK OPERATES SIMILARLY EXCEPT THAT THERE ARE FOUR LEVELS OF
*          LOOKUP
*          -L1 NOHIT UNPACK 1;HIT UNPACK PER CODE
*          -15(18 HEX) NOHIT UNPACK 3;HIT UNPACK 8
*          -L3 NOHIT UNPACK 1;HIT UNPAC PER CODE
*          -L4 NOHIT GO TO EOL;HIT UNPACK 8
*****************************************************************
WHITE1    LDU       LU1L1W
          LDA       B,U
          CMPA      $FF       TEST FOR VALID CODE
          LBNE      WEQ1      IF TRUE PUT LU1W CODE ON INST STACK
          LDA       $01       UNPACK 1 BIT
          LBSR      UNPACK    A NO. BITS;B TOP OF CM
          LDU       LU2L1W              LOOKUP2 WHITE
          LDA       B,U
          CMPA      $FF
          LBEQ      EOL1DW    IF NO CODE GO TO EOL ROUTINE
*****************************************************************
```

```
*FOLLOWING IS THE ROUTINE FOR WHITE MU/DIBIT
************************************************************
        LDU     MAILPO
        CMPU    $0003
        BNE     NORMMW    TEST FOR DIBIT
        STA     TEMP5
        ASLA              X2 TO INSTRUCTION
        ORA     $80       MAKEUP BIT BACK IN
        STA     ,Y+
        DEC     MIFCT     TEST FOR 64TH INST
        BNE     WMDV
        LBSR    UPDMAI    UPDATE INSTRUCTION STACK
WMDV    LDA     TEMP5
        ANDA    $7F
        LDA     $08       GET BIT COUNT
        LBSR    UNPACK
        LBRA    WHITE1
*
*FOLLOWING IS THE ROUTINE WHITE MU
*
NORMMW  STA     ,Y+
        DEC     MIFCT     TEST FOR LAST INSTRUCTION
        BNE     WMDVN
        LBSR    UPDMAI
WMDVN   LDA     $08       WHITE LEVEL2=9 BIT LONG-UNPACK 8 MORE BITS
        LBSR    UNPACK    UNPACK CM BITS
        BRA     WHITE1
************************************************************
*
*FOLLOWING IS THE PROGRAMFOR STACKING LU1W CODES ON THE STACK
*DIBIT AND 9600 MODES ARE ALSO IMPLEMENTED.
*DIBIT,9600,MU,TC, ARE BRANCH VARIABLES
*
************************************************************
WEQ1    BITA    $80
        LBNE    WHTMU     TEST FOR MAKEUP CODE
        CLR     TEMP7     0 TO EOL CT
        LDU     MAILPO
        CMPU    $0003     TEST FOR DIBIT MODE
        BNE     NORMWT
        STA     TEMP5     SAVE A
        CMPA    $20       TEST FOR CT GREATER THAN 32
        BGE     OVER32
        ASLA
        STA     Y+
        LDA     TEMP5
        LDU     LU1L2W
        LDA     A,U       BIT COUNT TOA
        LBSR    UNPACK    UNPACK CM BITS
        DEC     MIFCT     TEST FOR 64TH INSTRUCTION
        LBNE    BLA1
        LBSR    UPDMAI    UPDATE INSTRUCTION STACK
        LBRA    BLA1
*
*FOLLOWING IS THE ROUTINE FOR GTE 32 AND DIBIT
*
OVER32  LDA     $81
        STA     ,Y+       64 TO INST STACK
        LDA     TEMP5
        ASLA
        SUBA    64        2N-64 TO INST STACK
        DEC     MIFCT     TEST FOR 64TH INST TO STACK
        BNE     AG32
        LBSR    UPDMAI
AG32    STA     Y+        INST TO STACK
        DEC     MIFCT     TEST FOR 64TH INST TO STACK
        BNE     AGP32
        LBSR    UPDMAI
AGP32   LDA     TEMP5
        LDU     LU1L2W    GET BIT COUNT FOR UNPACK
        LDA     A,U
        LBSR    UNPACK
```

```
            BRA       BLA1
****************************************************************
*FOLLOWING IS THE PROGRAM FOR 9600 AND 1D TC WHITE STACKING
****************************************************************
NORMWT  STA       Y+         INST TO STACK
        CMPA      $07
        BNE       WEQ11      TEST FOR 7 WHITE
        LDA       $04
        CMPA      MAILOP
        BNE       WEQ12      TEST FOR 9600 MODE
        LDA       $05
        BRA       WEQ12
WEQ11   LDU       LU1L2W             BIT COUNT TOA
        LDA       A,U
WEQ12   LBSR      UNPACK
        DEC       MIFCT
        BNE       BLA1
        LBSR      UPDMAI     UPDATE INSTRUCTION STACK
        BRA       BLA1
****************************************************************
*FOLLOWING IS THE STACK PROCEDURE FOR WHITE MU(L1)
****************************************************************
WHTMU   LDU       MAILPO
        CMPU      $0003      TEST FOR DIBIT
        BEQ       WHITDI
        STA       Y+
WEMERG  ANDA      $7F
        ORA       $40
        LDU       LU1L2W
        LDA       A,U        GET BIT UNPACK COUNT
        LBSR      UNPACK
        DEC       MIFCT      TEST FOR LAST INSTRUCTION
        LBNE      WHITE1
        LBSR      UPDMAI
        LBRA      WHITE1
****************************************************************
WHITDI  STA       TEMP5
        ASLA
        ORA       $80
        STA       Y+
        LDA       TEMP5      RESTORE ORIGINAL
        BRA       WEMERG     RETURN FROM DIBIT MU WHITE STACK
****************************************************************
*PROCEDURE STACK BLACK
*       Y CONTAINS ADDRESS FOR NEXT INST TO BE PLACED
*       MIFCT CONTAINS  BYTES REMAINING TO BESTACKED OF 64
*       B CONTAINS TOP OF CM DATA
****************************************************************
BLA1    LDU       LU1L1B
        LDA       B,U
        CMPA      $FF                TEST FO VALID CODE
        BNE       BEQ1       IF TRUE PUT LU1B ON STACK
        LDA       $01
        LBSR      UNPACK
        CMPB      $18        TEST FOR 15 BLACK CODE
        BEQ       B15
        LDA       $03
        LBSR      UNPACK
        LDU       LU3L1B
        LDA       B,U        L3 BLACK LOOKUP
        CMPA      $FF        TEST FOR VALID CODE
        BNE       BEQ3
        LDA       $01
        LBSR      UNPACK
*       *SHIFT OFF ONE CM BIT
*       *
        LDU       LU4L1B
        LDA       B,U
        CMPA      $FF
        LBEQ      EOL1DB     IF NOT 1D CODE GO TO EOL ROUTINE
****************************************************************
```

```
*FOLLOWING IS THE L4 BLACK STACKER
*       A CONTAINS THE INST TO BE STACKED
***************************************************************
        LDU     MAILPO
        CMPU    $0003   TEST FOR DIBIT
        BNE     BEQL4
        LSLA            X2 TO COUNT
        ORA     $80     MU COUNT BIT REINSTALLED
BEQL4   STA     Y+
        LDA     $08     UNPACK BIT COUNT =8
        LBSR    UNPACK
        DEC     MIFCT   TEST FOR BUFFER FULL
        BNE     BLA1
        LBSR    UPDMAI  UPDATE INTERFACE DMAC OP
        BRA     BLA1
***************************************************************
*
*FOLLOWING IS THE ROUTINE FOR 15 BLACK
*
***************************************************************
B15     LDU     MAILPO
        LDA     $0F
        CMPU    $0003   TEST FOR DIBIT
        BNE     B15PL
        LSLA
B15PL   STA     Y+
        LDA     $08     8 TO BIT COUNT
        LBSR    UNPACK
        DEC     MIFCT
        LBNE    WHITE1
        LBSR    UPDMAI  UPDATE DMAC
        LBRA    WHITE1
***************************************************************
*PROCEDURE STACK LEVEL 1 BLACK
*
***************************************************************
BEQ1    LDU     MAILPO
        CMPU    $0003   TEST FOR DIBIT
        BNE     BEQ12
        LSLA
        STA     Y+
        LSRA            RETURN A TO ORIGINAL VALUE
        BRA     BEQ11
BEQ12   STA     Y+      INST TO CTRLR STACK
BEQ11   LDU     LU1L2B
        LDA     A,U
        LBSR    UNPACK  UNPACK SELECTED CM BITS
        DEC     MIFCT   64 INSTS ON STACK?
        LBNE    WHITE1
        LBSR    UPDMAI
        LBRA    WHITE1
***************************************************************
*FOLLOWING IS THE STACKING ROOUTINE FOR LEVEL3 BLACK
***************************************************************
BEQ3    BITA    $80     TEST FOR MAKEUP CODES
        BEQ     BTERM
        CMPA    $81     TEST FOR BLACK 64
        BEQ     B64
        LDU     MAILPO
        CMPU    $0003   TEST FOR DIBIT
        BNE     BNOTDI
        ASLA
        ORA     $80
BNOTDI  STA     Y+
        LDA     $08
BRET3   LBSR    UNPACK  UNPACK CM BITS
        DEC     MIFCT   TEST FOR 64 INSTS
        LBNE    BLA1
        LBSR    UPDMAI
        LBRA    BLA1
B64     LDU     MAILPO
        CMPU    $0003   TEST FOR DIBIT
```

```
              BNE      B64PL
              ASLA
              ORA      $80      PUT MS BIT BACK IN
B64PL         STA      Y+
              LDA      $06
              BRA      BRET3
***************************************************************
*STACK LEVEL 3 BLACK TERMINATE CODES
***************************************************************
BTERM         LDU      MAILPO
              CMPU     $0003    TEST FOR DIBIT
              BNE      NORMBK
              STA      TEMP5    SAVE A
              CMPA     $20      TEST FOR GREATER THAN 32
              BGE      BOV32
              ASLA
              STA      Y+       INST TO STACK
              LDA      TEMP5
              LDU      LU3L2B
              LDA      A,U      FIND UNPACK COUNT
              LBSR     UNPACK
              DEC      MIFCT    TEST FOR 64 INSTS
              LBNE     WHITE1
              LBSR     UPDMAI
              LBRA     WHITE1
***************************************************************
*FOLLOWING IS THE ROUTINE FOR GTE32 AND DIBIT(L3)
***************************************************************
BOV32         LDA      $81      64 TO INST STACK
              STA      Y+
              LDA      TEMP5
              ASLA
              SUBA     64       2N-64 TO INST STACK
              DEC      MIFCT    TEST FOR 64TH INST
              BNE      BAG32
              LBSR     UPDMAI
BAG32         STA      Y+
              DEC      MIFCT    TEST FOR 64TH INSTRUCTION
              BNE BAP32
              LBSR     UPDMAI
BAP32         LDA      TEMP5
              LDU      LU1L2W
              LDA      A,U      UNPACK SPECIFIED NO. BITS
              LBSR     UNPACK
              LBRA     WHITE1
***************************************************************
*FOLLOWING IS THE CODE FOR STACKING BLACK3 NORMAL
***************************************************************
NORMBK        STA      Y+       STACK I/F INSTRUCTION
              LDU      LU3L2B
              LDA      A,U
              LBSR     UNPACK   UNPACK NO. BITS
              DEC      MIFCT    TEST FOR 64 INSTS
              LBNE     WHITE1
              LBSR     UPDMAI   SETUP INSTRUCTIONS
              LBRA     WHITE1
***************************************************************
*
*PROCEDURE UNPACK
*THE FORMAT FOR THE SUBROUTINE IS AS FOLLOWS
*        -A CONTAINS THE COUNT OF BITS USED(SHIFTED OFF STACK)
*        -B CONTAINS THE 8 LATEST CM BITS
*        RES CONTAINS 1-8 BITS OF RESIDUE(RAM)
*        RESCT CONTAINS COUNT FOR  BITS IN RESIDUE
*THIS ROUTINE RETURNS WITH B CONTAINING NEW CM BITS,RES
*NEW RESIDUE, AND RESCT BIT COUNT FOR RESIDUE
*RESZER CONTAINS BITS SHIFTED OFF (UNPACK 1 BIT)
***************************************************************
UNPACK        STA      TEMP3
              CMPA     $08      TEST FOR SHIFT BY 8
              BEQ      SHIF8
              LDU      MULTAB
```

```
            LDA     A,U     LDA WITH MULTIPLIER FOR SHIFT COUNT
            STA     TEMP2
            MUL             SHIFT BY TABLE VALUE
            ASL     RESZER
            ORA     RESZER  PLACE SHIFTED OFF BIT IN RESZER
            STB     TEMP1
            LDA     TEMP2   RELOAD MULTIPLIER
            LDB     RES
            MUL             SHIFT RESIDUE
            ORA     TEMP1   NEW PACKED BYTE IN TEMP1
            STA     TEMP1
            STB     RES     STORE NEW RESIDUE
            LDB     RESCT   GET RESIDUE COUNT
            SUBB    TEMP3   CALCULATE NEW RESIDUE CT
            BLE     PAKUP   BRANC IF RESCT LE ZERO
            STB     RESCT   UPDATE RESIDUE COUNT
            LDB     TEMP1
            RTS
*****************************************************************
SHIF2       LDB     RES
            STB     TEMP1   RESIDUE COUNT TO TEMP1
            LDB     RESCT
            SUBB    TEMP3   CALCULATE NEW RESIDUE COUNT
            BRA     PAKUP
*****************************************************************
MULTAB      FDB     $0002,$0408,$1020,$4080
*
*PROCEDURE RESCT=0
*       TEMP1 CONTAINS TOP OF CM
*****************************************************************
PAKUP       BLT     RESNEG
PAKUP2      LEAX    +1,X    INC CM PTR
            DEC     MCMCT   LAST?
            BEQ     POPZ
            LDA     X       GET NEXT CM BYTE
            STA     RES
            LDA     $08
            STA     RESCT
            LDB     TEMP1
            RTS
*****************************************************************
*PROCEDURE RESCT NEGATIVE
*
*AT THIS POINT THE TOP OF CM IS A BYTE FRACTION
*       MS 8 BITS OF CM NOT YET RETURNED-POP STACK,CALCULATE
*       NEW CM VALUE AND NEW RESIDUE COUNT
*       B-NEGATIVE  RESIDUE VALUE(1-7)
*       TEMP1 TOP OF CM
*GGGGGGGGGGGGGGGGGGGGGGGGGGGGGGGGGGGGGGGGGGGGGGGGGGGGGGGGG
RESNEG      LEAX    +1,X
            DEC     MCMCT
            BEQ     POPN
            COMB            MAKE RES COUNT POSITINE
            INCB
            STB     RESCT
            LDB     X
            LDA     RESCT
            LDU     MULTAB
            LDA     A,U     SHIFT OFF 8 BIT RESIDUE BY COUNT
            MUL
            ORA     TEMP1   A CONTAINS NEW VALUE OF CM DATA
            STB     RES     NEW RESIDUE
            LDB     $08
            SUBB    RESCT
            STB     RESCT   GET NEW RESIDUE COUNT
            TFR     A,B     A TO B
            RTS             RETURN
*****************************************************************
*AT THIS POINT THE LAST WORD IN THE PRESENT 64 BYTE BUFFER HAS
*BEEN USED. WE MUST THEN MOVE TO THE NEXT ACTIVE BUFFER SEGMENT
*IF NO ACTIVE BUFFER SEGMENTS THEN WAIT FOR END OF BUFFER TO
*OCCUR. THE CONDITIONS FOR END OF BUFFER ARE:
```

```
*         -DMAC FIRQ
*         CM SYNC BIT GOES INACTIVE
*         -8 MS WITHOUT RECEIVING A NEW BYTE(S/W TIMEOUT)
*
*THE END PTR FOR THE CM DATA IS ZEROED. THE NEXT POINTER
*IS TESTEED FOR VALIDITY. IF NON ZERO THEN BUFFER IS ACTIVE.
*THE STACK IS THEN POPPED AND THE ROUTINE IS RETURNED.
*ESTRCP IS POINTER TO ACTIVE/EMPTY MAILBOX FOR PRESENT CM.
*MCM IS UPDATED. MCMCT IS UPDATED TO CT.=64.
*
*PROCEDURE POP
*GGGGGGGGGGGGGGGGGGGGGGGGGGGGGGGGGGGGGGGGGGGGGGGGGGGGGGGGGGGG
POPZ      LDB       $0000
          STB       [ESTRCP]       ZERO TO ACTIVE MAILBOX PTR
          INC       ESTRPP
          LDA       $F7
          ANDA      ESTRPP
          STA       ESTRPP         INC ESTRCP,NO OVERFLOW TO B3
          LDD       $0040          INC MCM BY 64
          STB       MCMCT          CT.=64 TO MCMCT
          ADDD      MCM
          CMPD      $0600          TEST FOR OVERFLOW OF ADDRESS
          BLT       OKPOPZ
          LDD       $0400
OKPOPZ    STD       MCM            RESTORE POINTER
          TFR       D,X            D TO X
          LDB       [ESTRCP]       CHECK NEXT MAILBOX(0-EMPTY
          LBNE      POPZA          IF MAILBOX ZERO OVERRUN HAS OCCURRED
          LBSR      WAIT
POPZA     LDA       X              GET TOP OF CM
          STA       RES
          LDA       $08            STORE 8 AT RESIDUE COUNT
          STA       RESCT
          LDB       TEMP1
          RTS
*************************************************************
*PROCEDURE POPNEGATIVE
*
*INPUTS
*         RES,RESCT,ESTRCP
*THIS ROUTINE IS THE SAME AS ABOVE EXCEPT RESIDUE AND
*TOP CM VALUES REMAIN TO BE DETERMINED.TEMP1 CONTAINS PARTIAL
*BYTE OF CM DATA. B CONTAINS VALUE (NEGATIVE) OF COUNT DEFICIT
*OF CM DATA. MCM IS LOADED WITH NEW ADDRESS AND MCMCT WITH 64.
*************************************************************
POPN      COMB      PLEASE WORK
          INCB      MAKE COUNT POSITIVE
          STB       RESCT
          LDA       $00
          STA       [ESTRCP]       CLEAR PRESENT BUFFER EMPTY MAILBOX
          INC       ESTRPP
          LDA       $F7
          ANDA      ESTRPP
          STA       ESTRPP         INCREMENT PTR MOD 8
          LDD       $0040
          STB       MCMCT          MCMCT LOADED WITH 64 MORE BYTES
          ADDD      MCM
          CMPD      $0600          TEST FOR ADDRESS OVERFLOW OF STACK AREA
          BLT       OKPOPN
          LDD       $0400          LOAD WITH START STACK ADDRESS
OKPOPN    STD       MCM            RESTORE MCM PTR (INC BY 64)
          TFR       D,X            D TO X NEW ADDRESS SPACE
          LDA       [ESTRCP]
          BNE       POPN1          TEST FOR NEXT BUFFER ACTIVE
          LBSR      WAIT           IF NO, WAIT UNTIL NEXT CM BUFFER CLEARS
POPN1     LDB       X
          LDA       RESCT
          LDU       MULTAB
          LDA       A,U
          MUL                      SHIFT BY RESIDUE COUNT
          ORA       TEMP1          A CONTAINS NEW CM DATA
          STB       RES
```

```
          LDB     $08
          SUBB    RESCT   CALCULATE NEW RESIDUE COUNT
          STB     RESCT
          TFR     A,B     A TO B
          RTS
*****************************************************************
*PROCEDURE CM WAIT
*       INPUTS;CMSYNC-TEST FOR BUFFER END,ESTRCP-FF NEXT BUF RDY
*
*THE WAIT ROUTINE MONITORS THE CMSYNC LINE.IF IT GOES INACTIVE
*THEN A ROUTINE TO ADJUST THE COUNTS AND ADDRESSING IS ENTERED.
*ALSO AN 8 MS TIME IS MEASURED TO SEE IF ANY DATA BYTES HAVE
*COME IN IN THE LAST 8 MS.IF THIS TIMES OUT WE GO TO THE SAME
*ADJUST ROUTINE.
*ESTRCP IS MONITORED IF THIS GOES ACTIVE WE RETURN.ACTIVE=FF.
*FIRQ IS ENABLED
*****************************************************************
WAIT      LDA     DMABL0  GET DMAC BYTE COUNT
          STA     TEMP13
          LDU     186     CYCLE COUNT FOR 8 MS
WAITPL    LDA     $01
          BITA    CMSYNC  SEE IF CM STOPPED
          LBEQ    ADJUST
          LDA     [ESTRCP]        CHECK IF NEXT MAILBOX FULL
          BNE     WTRET
          LDA     NETFLG  TEST IF NETWORK OPERATION IN PROGRESS
          BEQ     LDTEMP
          LDA     DMAP
          ORA     $01
          STA     DMAP    START COM DMAC
LDTEMP    LDA     TEMP13
          CMPA    DMABL0  TEST IF BYTE COUNT CHANGED
          BNE     WAIT
          LEAU    -1,U
          LBEQ    LUKEOL  U TIMES OUT END NOW ENDS
          BRA     WAITPL
WTRET     LDX     MCM
          RTS
*****************************************************************
*PROCEDURE END DOCUMENT
*
*THIS PROCEDURE LOOKS FOR 6 EOL IN THE DATA STREAM AFTER AN 8 MS WAIT
*WITH NO;DATA HAS BENN ENCOUNTERED. 6 EOLS ARE LOOKED FOR.IF 6 NOT
*FOUND THEN RETURN TO WAIT. IF 6 FOUND THEN GO TO ADJUST.
*****************************************************************
*TEMP14 CONTAINS NO. OF ZEROES IN A ROW
*TEMP11 CONTAINS NO. OF EOLS
*TEMP12 CONTAINS NO. OF BITS USED IN BYTE
*TEMP15 IS BUF BOUNDARY FLAG,0=BOUND NOT CROSSED,FF=CROSS
LUKEOL    LDA     DMABL0
          BEQ     WAIT    TEST FOR NO BYTES IN BUF
          CLR     TEMP15
          CLR     TEMP11
          LDA     $08
          STA     TEMP12  8 TO BYTE COUNT
          LDU     DMAAH0
          CMPU    $0400
          BGT     LDADMA
          LDU     $05C0
          STU     RAMHLD  BOUNDARY CONDITION ENCOUNTERED
          LDU     $05FF
          BRA     LEAUM1
LDADMA    LDA     DMAAL0
          ANDA    $C0
          STU     RAMHLD
          STA     RAMHLP  THIS IS THE BUF BASE
LEAUM1    LEAU    -1,U    DECREMENT U
LDAUUU    LDA     U       GET TOP OF STACK
ROLA      ROLA
          BCS     FINDEN  IF BIT =1 GO TO EOL FINDER
          DEC     TEMP12  TEST FOR LAST BIT USED
```

```
                BNE     ROLA
                LDA     $08
                STA     TEMP12   8 BITS TO BYTE COUNT
                CMPU    RAMHLD
                BNE     LEAUM1
                LBRA    WAIT     IF END RETURN TO WAIT
*
*NOW FIND THE EOLS
*
FINDEN   STA    RAMKEP
         LDA    11
         STA    TEMP14   11 TO ZEROCT REGISTER
         LDA    RAMKEP
DECT12   DEC    TEMP12
         BEQ    NEXSET   IF 8 BITS USED GET NEXT BYTE
RORAG    ROLA
         BCS    TEST3E   IF BIT SET SEE IF 6 EOLS RCVD
         TST    TEMP14
         BEQ    ARDECZ
         DEC    TEMP14
ARDECZ   BRA    DECT12
*
TEST3E   TST    TEMP14
         LBNE   WAIT
         INC    TEMP11
         LDA    $06
         CMPA   TEMP11
         LBEQ   ADJUST   6 EOLS FOUND
         BRA    FINDEN
*
NEXSET   CMPU   RAMHLD
         BEQ    BUFMRG
         LDA    $08
         STA    TEMP12   8 BITS TO BYTE COUNT
         LEAU   -1,U
         LDA    U
         BRA    RORAG    DO NEXT BYTE
*
BUFMRG   LDA    TEMP15
         LBNE   WAIT     IF 2ND BUFFER RETURN
         CMPU   $0400
         BNE    DECUAG
         LDU    $05FF
LDAFF    LDA    $FF
         STA    TEMP15   FLAG FF TO BUFFER BOUND FLAG
         STU    RAMHLD
         LDA    RAMHLP
         ANDA   $C0
         STA    RAMHLP   SETUP BUFFER ;BASE
         LDA    $08
         STA    TEMP12
         LDA    U
         BRA    RORAG
*
DECUAG   LEAU   -1,U
         BRA    LDAFF
****************************************************************
*PROCEDURE ADJUST
*NOW THE VALUE OF MCMCT IS ALTERED BASED ON THE NUMBER OF BYTES
*LEFT IN LAST BUFFER AREA.     VALUE IS CONTAINED IN THE DMAC
*BYTE COUNT.    RETURN WITH X AND MCM ADJUSTED.
*
*IF THE CMSYNC WAS CLEARED BEFORE,THEN THE SDD OUTPUT CMSYNC IS
*CLEARED AND SDD RETRURNS TO IDLE
*INPUTS;MAILEN(01-PREVIOUS WAIT DETECTED,00 NOT)
****************************************************************
ADJUST   LDB    $FE      DISABLE DMACO
         ANDB   DMAP
         STB    DMAP
         LDA    $01
         BITA   MAILEN   TEST FOR CMSYNC DETECTED PREVIOUS CYCLE
         BEQ    ENDWT
```

```
              STA      MAILEN
              LDA      64
              SUBA     DMABL0    CALCULATE NO.BYTES RECEIVED
              BEQ      ENDWT
              STA      MCMCT     NEW COUNT IN MAILBOX
              LDX      MCM
              RTS
***************************************************************
*AT THIS POINT ALL CM DATA IS EXHAUSTED.
*THE PROGRAM THEN WAITS FOR ALL ENCODED INSTRUCTIONS TO
*CLEAR THE INTERFACE CONTROLLER. AFTER THIS OCCURS WE RETURN TO IDLE
*THE CRITERIA FOR RETURN TO IDLE IS THAT ALL BUFFERS
*BE INACTIVE (ESTRINS=0). THIS ROUTINE ALSO PUTS A 7F IN THE LAST
*ESTRIN AND THE REVISED BYTE COUNT IN TEMP1.(LT 64)
***************************************************************
ENDWT         LDA      $7F
              STA      [ESTRIP]  7F TO NEXT PTR MAILBOX-PARTIAL BUFFER
              LDA      DMABL1
              BNE      BACK1D
              LDA      DMABL1    TEST DMA BYTE CT FOR ZERO TWICE
              BNE      BACK1D
              CLR      DMAP      DMA MAY BE ACTIVE-TURN OFF
              SWI
BACK1D        LDA      ESTRI0
              BNE      BACK1D
              LDA      ESTRI1
              BNE      BACK1D
              LDA      ESTRI2
              BNE      BACK1D
              LDA      ESTRI3
              BNE      BACK1D
              LDA      ESTRI4
              BNE      BACK1D
              LDA      ESTRI5
              BNE      BACK1D
              LDA      ESTRI6
              BNE      BACK1D
              LDA      ESTRI7
              BNE      BACK1D
              LBRA     RESET
***************************************************************
*PROCEDURE DMA UPDATE
*FOLLOWING IS THE DMA CONTROL PROGRAM FOR SETTING UP THE
*DMAC. TO ENTER THIS FIRQ IS ACTTIVE. THE ACTIVE CHANNELS
*ARE THEN UPDATED. AT THE END OF TX AN ODD NO. BYTES IS SENT THRU
*THE INTERFACE CONTROLLER. THIS ODD NO. IS DETECTED BY FINDING A 7F
*IN ESTRIN. IF FOUND A RESTART INSTRUCTION IS PLACED AT THE END. THE BYTE
*COUNT IN MIFCT IS INCREMENTED BY 1 AND THE DMAC IS ACTIVATED WITH THIS
*BYTE COUNT.OTHERWISE BYTE COUNT=64.
*INPUTS:ETRCPC,ETRIPC;BUF FULL MAIL, CM I/F;MIFCT,MCMCT
*FOR INSTRUCTIONS SENT THRU I/F ESTRIN CODES ARE:
*        -FF-64 INSTS PACKED IN BUFFER
*        -7F-ODD NO. INSTS IN BUFFER
*        -CF-BUFFER IN DMA TX
*        -00-BUFFER EMPTY
***************************************************************
FIRQ          STD      FIRQT1    SAVE D
              LDB      DMABL0    TEST FOR INTERRUPT ACTIVE ON CHANNEL 0
              BNE      NOINT0
              LDB      DMAC0     CLEAR THE INTERRUPT
              LDA      DMAP
              ANDA     $02
              STA      DMAP      DISABLE CH0
              LDA      64
              STA      DMABL0    64 TO BYTE COUNT
              LDD      DMAAH0
              CMPD     $0600     TEST FOR ADDRESS OVERFLOW
              BLT      OKSTAK
              LDD      $0400
OKSTAK        STD      DMAAH0
              LDA      $FF       LOAD NEXT CM MAILBOX ACTIVE
              STA      [ETRCPC]
```

```
              LDD      ETRCPC
              INCB                GO TO NEXT PTR
              ANDB     $F7
              STD      ETRCPC     LOAD NEW MAILBOX PTR
              LDA      [ETRCPC]            TEST FOR OVERRUN
              BEQ      ORAF
              LDA      NETFLG
              BEQ      ORAF       IF NOT NETWORK START DMAC
              RTI
ORAF          LDA      DMAP
              ORA      $01
              STA      DMAP       CH 0 ENABLED FOR ANOTHER BUFFER
NOINT0        LDB      DMABL1
              BNE      NOINT1
              LDB      DMAC1      THIS TEST FOR INT ON CH1 AND CLRS IT
              LDA      $01
              ANDA     DMAP
              STA      DMAP       DISABLE CHANNEL 1
              CLR      [ETRIPC]            ZERO BUFFER JUST FINISHED
              LDD      ETRIPC
              INCB
              ANDB     $F7        CORRECT FOR MOD 8 ARITH
              STD      ETRIPC
SWI           LDA      [ETRIPC]
              CMPA     $FF
              BEQ      FULDMA     IF FF FULL 64 BYTES TO BE SENT
              CMPA     $7F
              BNE      NOINT1
              LDA      64
              SUBA     MIFCT      CALCULATE NEW BUF LENGTH
              STA      DMABL1
              LDD      DMAAH1
              CMPD     $0800      TEST FOR ADDRESS OVERFLOW
              BLT      OKINST
              LDD      $0600      LOAD START BUF ADDRESS
OKINST        STD      DMAAH1     ADDR BACK TO DMAC AS CLEARED
              LDA      $0F
              STA      [ETRIPC]            BUFFER ACTIVE TO MAILBOX
              LDA      DMAP
              ORA      $02
              STA      DMAP       ENABLE CHANNEL 1
NOINT1        LDD      FIRQT1
              RTI
FULDMA        LDA      64
              STA      DMABL1     64 TO BYTE COUNT
              LDD      DMAAH1
              CMPD     $0800
              BLT      OKFULD     TEST FOR ADDRESS OVERFLOW
              LDD      $0600
OKFULD        STD      DMAAH1
              LDA      $0F
              STA      [ETRIPC]            BUFFER ACTIVE TO MAILBOX
              LDA      DMAP
              ORA      $02        ENABLE DMAC CHANNEL 1
              STA      DMAP
              LDD      FIRQT1
              RTI
****************************************************************
*FOLLOWING IS THE UPDATE DMA CODE FOR INSTRUCTION STRINGS
*THE PRESENT BUFFER POINTER IS TESTED FOR BEING ACTIVE. IF ACTIVE
*THEN PRESENT ENCODE PTR LOADED WITH FF AND PROGRAM RETURNS.
*IF INACTIVE THEN DMAC IS STARTED AT THE PROPER PLACE.MIF=ADDR,64
*=BYTE COUNT ,FSTRIP TO ETRIPC, 0F TO ETRIPC
*INPUTS:MIF,ESTRIN-ACTIVE
****************************************************************
UPDMAI        ORCC     $40        DISABLE FIRQ
              STD      UPDMAT
              LDA      DMABL1
              BEQ      DMAIT      IF ZERO START DMA BUFFER
UPDAGN        LDD      MIF
              ADDD     64
              CMPD     $0800      TEST FOR ADDRESS OVERFLOW
```

```
            BNE       OKNUMB
            LDD       $0600
OKNUMB      STD       MIF
            TFR       D,Y        D TO Y
            LDA       $FF
            STA       [ESTRIP]   FF TO MAILBOX
            LDA       64
            STA       MIFCT      64 TO COUNT
            LDD       ESTRIP
            INCB
            ANDB      $F7        MASK OFF BIT 3
            STD       ESTRIP     UPDATE ESTRIP ADDRESS
            LDD       UPDMAT
            ANDCC     $BF        ENABLE FIRQ
            RTS
***********************************************
DMAIT       ANDCC     $BF        ENABLE FIRQ
            NOP
            ORCC      $40        DISABLE FIRQ
            LDA DMABL1
            BNE       UPDAGN     TEST FOR DMA ACTIVE
            LDA       $01
            ANDA      DMAP
            LDA       DMAP       DISABLE CH 1
            CLR       [ETRIPC]   0 TO BUF FLAG COMPLETED
            LDD       MIF        GET START ADDRESS OF CODES
            STD       DMAAH1
            ADDD      64
            CMPD      $0800      TEST FOR FINAL ADDRESS
            BLT       OKVALU
            LDD       $0600
OKVALU      STD       MIF        INC MIF BY BASE 64
            TFR       D,Y        D TO Y
            LDA       $0F
            STA       [ESTRIP]   BUFFER ACTIVE FLAG TO ESTRIP
            LDD       ESTRIP
            STD       ETRIPC
            INCB
            ANDB      $F7        MASK OFF BIT 3
            STD       ESTRIP
            LDD       64
            STD       DMABH1
            LDA       $05
            STA       DMAC1
***TSC STEAL,READ
            LDA       64
            STA       MIFCT
            LDA       DMAP
            ORA       $02        ENABLE CHANNEL 1
            STA       DMAP
            LDD UPDMAT
            ANDCC     $BF        ENABLE FIRQ
            RTS
***************************************************************
*FOLLOWING IS THE EOL SUBROUTINE
*      THIS CODE FINDS THE EOLS IN THE DATA STREAM
*      IT LOOKS FOR 6 EOLS IN ALL MODES EXCEPT 9600
*THE SUBROUTINE RETURNS WITH TOP CM DATA IN B
***************************************************************
EOL1DW      CLR       COLOR      WHITE TO COLOR FLAG
            LDA       10         LOOK FOR 10 0'S IN EOL
            STA       ZEROCT
TESTEN      LDA       $01        TEST IF RES BIT SHIFTED OF ZERO
            BITA      RESZER
            BEQ       ARTHIS
            LBSR      INCERR
            BRA       NEXENX     INC ERR CT AND LOOK FOR 1ST 1 FOR EOL
ARTHIS      DEC       ZEROCT
***************************************************************
*THE FOLLOWING LOOKS FOR A 1 WHILE DECREMENTING THE SPECIFIED
*ZERO COUNT. IF A ZERO IS FOUND AT EACH POINT THE ZERO COUNT IS
*DECREMENTED AND THE CODE CYCLES UNTIL ZERO CT =0.AT THIS POINT
```

```
*WE EXIT AND SUBSEQUENTLY LOOK FOR THE 1-SYNC BIT. IF A 1 IS FOUND
*BEFORE ZEROCT=0 AN ERROR HAS OCCURRED AND WE THEN RESET ZEROCT TO
*MAXIMUM.
****************************************************************
NEXENX   CLR     ERRSTK
NEXEN8   BITB    $80       TEST FOR A 1 IN B7
         BEQ     ARERR8
         LBSR    INCERR
         BRA     NEXEN7
ARERR8   DEC     ZEROCT    DEC ZEROCT,THIS FINDS WHEN RIGHT NO.ZEROES EOL
         LBEQ    EOL1D7
NEXEN7   BITB    $40
         BEQ     ARERR7
         LBSR    INCERR
         BRA     NEXEN6
ARERR7   DEC     ZEROCT
         LBEQ    EOL1D6
NEXEN6   BITB    $20
         BEQ     ARERR6
         LBSR    INCERR
         BRA     NEXEN5
ARERR6   DEC     ZEROCT
         LBEQ    EOL1D5
*        *
NEXEN5   BITB    $10
         BEQ     ARERR5
         LBSR    INCERR
         BRA     NEXEN4
ARERR5   DEC     ZEROCT
         LBEQ    EOL1D4
*        *
NEXEN4   BITB    $08
         BEQ     ARERR4
         LBSR    INCERR
         BRA     NEXEN3
ARERR4   DEC     ZEROCT
         BEQ     EOL1D3
*        *
NEXEN3   BITB    $04
         BEQ     ARERR3
         LBSR    INCERR
         BRA     NEXEN2
ARERR3   DEC     ZEROCT
         BEQ     EOL1D2
*        *
NEXEN2   BITB    $02
         BEQ     ARERR2
         LBSR    INCERR
         BRA     NEXEN1
ARERR2   DEC     ZEROCT
         BEQ     EOL1D1
*        *
NEXEN1   BITB    $01
         BEQ     ARERR1
         LBSR    INCERR
         LDA     $08
         LBSR    UNPACK
         BRA     NEXEN8
ARERR1   LDA     $08
         LBSR    UNPACK
         DEC     ZEROCT
         BEQ     EOL1DC
         LBRA    NEXEN8
*        *
INCERR   CLR     TEMP7     0 TO EOL COUNT
         LDA     ERRSTK
         BNE     ARTERR    IF AN ERRCT INC IN THIS EOL,DONT INC ERRCT
         LDA     ERMAIL
         CMPA    $FF       TEST FOR ERR OVERFLOW
         BEQ     ARTERR
         NOP
         COM     ERRSTK
```

```
ARTERR  LDU    MAILPO
        CMPU   $0004    TEST FOR 9600 MODE
        BNE    EOL1EE
        LDA    10
        STA    ZEROCT
        RTS
EOL1EE  LDA    11
        STA    ZEROCT
        RTS
*       *
EOL1DA  LDA    $08
        LBSR   UNPACK   UNPACK 8 BITS
EOL1DC  BITB   $80
        BNE    EOL8
EOL1D7  BITB   $40
        BNE    EOL7
EOL1D6  BITB   $20
        BNE    EOL6
EOL1D5  BITB   $10
        BNE    EOL5
EOL1D4  BITB   $08
        BNE    EOL4
EOL1D3  BITB   $04
        BNE    EOL3
EOL1D2  BITB   $02
        BNE    EOL2
EOL1D1  BITB   $01
        BNE    EOL1
        BRA    EOL1DA
EOL8    LDA    $01      A IS LOADED WITH UNPACK COUNT
        BRA    CONTA
EOL7    LDA    $02
        BRA    CONTA
EOL6    LDA    $03
        BRA    CONTA
EOL5    LDA    $04
        BRA    CONTA
EOL4    LDA    $05
        BRA    CONTA
EOL3    LDA    $06
        BRA    CONTA
EOL2    LDA    $07
        BRA    CONTA
EOL1    LDA    $08
*****************************************************************
*WHEN THE 1 BIT IS FOUND IF IN 1D OR 2D OR DIBITMODE THE PROGRAM
*NEXT LOOKS TO SEE IF ANOTHER 6 EOLS HAS COME IN.IF IT HAS CM OPERATION
*IS TERMINATED AND PROGRAM RETURNS TO IDLE
*****************************************************************
CONTA   LBSR   UNPACK   UNPACK THE SPECIFIED NO. BITS
        LDA    TEMP7
        BNE    ARCONT
        LDA    $58      RESET INST TO STACK
        STA    Y+
DECMIF  DEC    MIFCT
        BNE    ARCONT   TEST FOR 64TH INSTRUCTION
        LBSR   UPDMAI
ARCONT  LDU    MAILPO
        CMPU   $0004
        BEQ    EOL96    TEST FOR 9600 OPERATION
        INC    TEMP7
        LDA    TEMP7
        CMPA   $06      GO TO WAIT IF 6TH EOL
        LBEQ   ENDWT
EOL96   LDU    MAILPO
        CMPU   $0005    TEST FOR 2D OP IN PROGRESS
        BEQ    RETN2D
        LBRA   WHITE1   RETURN TO 1D DECODE
RETN2D  RTS             RETURN FROM SUBROUTINE
*
EOL1DB  CLR    COLOR
        LDA    $05
```

```
            STA     ZEROCT   5 ZEROES OUT AT THIS POINT
            LDA     $1F
            BITA    RESZER
            BNE     NOENDH
            LBRA    NEXENX   ALL IS WELL, GO FIND THE EOL
*           *
NOENDH      CLR     CNTRZZ
            LDA     $08
BTAR        BITA    RESZER   TEST FOR A 1 BIT
            BEQ     RESTTT
            CLR     CNTRZZ
LSRAZZ      LSRA
            BNE     BTAR     CONTINUE UNTIL ALL RESZER BITS TESTED
            LDA     10
            SUBA    CNTRZZ
            STA     ZEROCT
            LBRA    NEXENX   ZEOCT HAS 10- ZEROES IN RESZER
*
RESTTT      INC     CNTRZZ
            BRA     LSRAZZ
*           *
EOL2D       LDA     10       11 TO ZERO BIT COUNT
            STA     ZEROCT
            LBRA    NEXENX
*           *
****************************************************************
*INITIATE 9600
****************************************************************
N9600       LDA     $04
            CLR     COLOR
            STA     MAILOP   MODE TYPE TO MAILOP
            LDU     $0004
            STU     MAILPO
            LBSR    STDECO
            LBSR    DECODE
            LBRA    WHITE1
****************************************************************
*INITIATE DIBIT
****************************************************************
DIBIT       LDA     $03
            STA     MAILOP   DIBIT TO MAILOP
            CLR     COLOR
            LDU     $0003    DIBIT TO U
            STU     MAILPO
            LBSR    STDECO
            LBSR    DECODE
            LBRA    WHITE1
****************************************************************
*FOLLOWING IS THE 2 D DECODE ROUTINE. A SPECIAL UNPACK IS IMPLEMENTED
*FOR VERY SHORT CODES.-V0;THE ROUTINE KEEPS TRACK OF THE COLOR
*COLOR BIT 0 IS 0=WHITE;1=BLACK.COLOR IS TOGGLED AT EACH CODE EXCEPT
*PASS AND MAKEUP COUNT. AFTER EOL THE PROGRAM TESTS THE NEXT BIT
*IF A 0 IS FOUND THEN PROGRAM BRANCHES TO THE 1D PROGRAM(BRA DECODE.
*
*TWOSD=CODE 05
****************************************************************
*
TWOSD       LDA     $05
            STA     MAILOP
            LDU     $0005
            STU     MAILPO
            CLR     COLOR    WHITE TO COLOR
            LBSR    STDECO
            LBSR    DECODE
            CLR     TEMP6
****************************************************************
*FOLLOWING IS THE 1D DECODE SECTION OF THE 2D ALGORITHM
*THIS PROGRAM DECODES 1D LINES AND 1D CODES WITHIN 2D LINES. TEMP6
*CONTAINS STATUS OF THE PROGRAM. FF IN TEMP6 MEANS WE ARE DECODING A 1D
*SECTION OF A 2D LINE.A 00 MEANS WE ARE DECODING A FULL 1D LINE.
*TCNT CONTAIN CT OF TCS IF IN 2D
****************************************************************
```

```
*
*
WHIT12   LDU      LU1L1W
         LDA      B,U           TEST FOR VALID CODE
         CMPA     $FF               IF TRUE PUT LU1W ON STACK
         LBNE     WEQ12D
         LDA      $01
         LBSR     UNPACK
         LDU      LU2L1W
         LDA      B,U
         CMPA     $FF           TEST FOR VALID
         LBEQ     ONED2W        EOL CONDITION
         STA      Y+
         LDA      $08
ONED2M   LBSR     UNPACK
         DEC      MIFCT         TEST FOR 64TH INST
         BNE      WOVER2
         LBSR     UPDMAI
WOVER2   BRA      WHIT12
****************************************************************
*
*FOLLOWING IS THE STACKING OF WHITE TC
*AND SHORT MAKEUP CODES(LESS THAN 8 BIT MU'S)
*
WEQ12D   CLR      TEMP7
         STA      Y+
         BITA     $80           TEST FOR MAKEUP
         BEQ      WTC12
         ANDA     $7F
         ORA      $40
         LDU      LU1L2W
         LDA      A,U
         BRA      ONED2M
WTC12    LDU      LU1L2W
         LDA      A,U           GET UNPACK COUNT
         LBSR     UNPACK
         DEC      MIFCT
         BNE      ARW112
         LBSR     UPDMAI
ARW112   LDA      TEMP6         TEST FOR CODING TYPE
         BGE      BLA12
         LDA      TCNT
         LBNE     TWODEC        RETURN IF LAST
         INC      TCNT          1 TC TO TCNT
         BRA      BLA12
*
*
****************************************************************
****************************************************************
*PROCEDURE BLACK 1D-2D SUB
*        -B CONTAINS CM TOP
*        -Y PTR TO INSTRUCTION STACK
*        -MIFCT NO. BYTES IN PRESENT STACK I
*        -TEMP6=STATUS 1D(00) OR 2D SUB(FF)
*        -TCNT= TERMINATE COUNTS STACKED FOR 2D SUB(RETURN AFTER 2)
****************************************************************
BLA12    LDU      LU1L1B
         LDA      B,U           TEST FOR VALID CODE
         CMPA     $FF
         BNE      BEQ112        IF TRUE PLACE INST ON STACK
         LDA      $01
         LBSR     UNPACK
         CMPB     $18           TEST FOR 15 BLACK CODE
         LBEQ     B152D
         LDA      $03
         LBSR     UNPACK
         LDU      LU3L1B
         LDA      B,U
         CMPA     $FF           TEST FOR VALID CODE
         BNE      BEQ32
         LDA      $01
```

```
        LBSR    UNPACK  UNPACK 1 CM BIT
        LDU     LU4L1B
        LDA     B,U
        CMPA    $FF
        LBEQ    ONED2B  EOL OR ILLEGAL CODE CONDITION
*********************************************************************
*L4 BLACK STACKER
*GGGGGGGGGGGGGGGGGGGGGGGGGGGGGGGGGGGGGGGGGGGGGGGGGGGGGGGGGGGGGGGGGGGGG
        STA     Y+
        LDA     $08     8 TO BIT COUNT
        LBSR    UNPACK
        DEC     MIFCT   TEST FOR 64TH INSTRUCTION
        BNE     BLA12
        LBSR    UPDMAI
        BRA     BLA12
*********************************************************************
*LEVEL 1 BLACK
*       A CONTAINS CODE TO BE STACKED
*       B CONTAINS TOP OF CM
*       Y IS PTR TO I/F STACK
*       MIFCT CONTAINS COUNT IN I STACK
*********************************************************************
BEQ112  STA     Y+
        LDU     LU1L2B
        LDA     A,U     GET BIT COUNT
        LBSR    UNPACK
        DEC     MIFCT   TEST FOR 64 BYTES
        BNE     ARB112
        LBSR    UPDMAI
ARB112  LDA     TEMP6   TEST FOR CODING TYPE(1D OR 2D SUBROUTINE)
        LBGE    WHIT12
        LDA     TCNT
        LBNE    TWODEC
        INC     TCNT    IF NONZERO RETURN-OTHERWISE INCREMENT
        LBRA    WHIT12
*********************************************************************
*STACK BLACK 15
*********************************************************************
B152D   LDA     $0F
        STA     Y+
        LDA     $08     8 TO UNPACK COUNT
        LBSR    UNPACK
        DEC     MIFCT   TEST FOR BUFFER FULL
        BNE     NEXB2D
        LBSR    UPDMAI  UPDATE INTERFACE DMAC OP
NEXB2D  LDA     TEMP6   TEST FOR CODE TYPE (1D OR 2D SUBROUTINE)
        LBGE    WHIT12
        LDA     TCNT
        LBNE    TWODEC
        INC     TCNT    1 TC HAS BEEN SENT
        LBRA    WHIT12
*********************************************************************
*STACK LEVEL 3 BLACK
*********************************************************************
BEQ22   STA     Y+
        BITA    $80     TEST FOR MAKEUP CODE
        BEQ     BTERM2  GO TO BLACK TC
        CMPA    $81     64 BLACK?
        BEQ     B642D
        LDA     $08
TWODUN  LBSR    UNPACK
        DEC     MIFCT
        LBNE    BLA12
        LBSR    UPDMAI  SETUP DMAC INST BUFFERS
        LBNE    BLA12
*       *
B642D   LDA     $06
        BRA     TWODUN
*       *
BTERM2  LDU     LU3L2B
        LDA     A,U     FIND UNPACK COUNT
        LBSR    UNPACK  UNPACK BITS
```

```
        DEC     MIFCT   TEST FOR 64 INSTRUCTIONS
        BNE     ARBT2
        LBSR    UPDMAI
ARBT2   LDA     TEMP6   TEST FOR CODING TYPE
        LBEQ    WHIT12
        LDA     TCNT
        LBNE    TWODEC
        INC     TCNT    1 TC TO TCNT
        LBRA    WHIT12
****************************************************************
*THIS PROGRAM SECTION KEEPS TRACK OF EOLS IN 2D
ONED2W  LBSR    EOL1DW  FIND EOL
        CLR     COLOR
        BITB    $80     TEST FOR 1D
        BNE     TWOONE  IF BIT ZERO GO TO 2D DECODE
        LDA     $01
        LBSR    UNPACK
        LBRA    TWODEC
*       *
ONED2B  LBSR    EOL1DB
        CLR     COLOR
        BITB    $80
        BNE     TWOONE  IF BIT ZERO GO TO 2D DECODE
        LDA     $01
        LBSR    UNPACK
        LBRA    TWODEC
****************************************************************
*
*FOLLOWING IS THE PROGRTO DECODE 2D CM DATA. THIS PROGRAM SIMPLY
*LOOKS FOR A 1 IN THE STRING. WHEN A 1 IS FOUND A CODE IS FOUND
*COLOR IS COMPLEMENTED AFTER EACH 2D CODE IS STACKED. THE 1D SUB
*RETURNS WITH THE PROPER COLOR. FOLLOWING ARE THE CODES:
*       -1=V(0)
*       -001=HORIZONTAL(FOLLOWED BY 2 TC'S PLUS SPEC'D MC'S)
*       -0001=PASS
*       -011=VR1
*       -000011=VR2
*       -0000011=VR3
*       -010=VL1
*       -000010=VL2
*       -0000010=VL3
*
****************************************************************
*
TWODEC  BITB    $80     TEST FOR VERTICAL ZERO
        BNE     VZERO
        BITB    $40     TEST FOR VERT 1 (L OR R)
        BNE     VERT1
        BITB    $20     TEST FOR HORIZONTAL
        BNE     HORIZ
        BITB    $10     TEST FOR PASS
        LBNE    PASS
        BITB    $08     TEST FOR VERT2(L OR R)
        LBNE    VERT2
        BITB    $04     TEST FOR VERT3(L OR R)
        LBNE    VERT3
        LBSR    EOL2D   GO TO EOL PROCEDURE
        BITB    $80
        BLT     TWOONE  IF B7 SET GO TO 1D
        LDA     $01     UNPACK 1 BIT
        LBSR    UNPACK
        CLR     COLOR
        BRA     TWODEC
****************************************************************
****************************************************************
TWOONE  LDA     $01
        LBSR    UNPACK  UNPACK 1 BIT
        CLR     COLOR
        CLR     TEMP6
        LBRA    WHIT12  CLR TYPE MAIL AND GO TO 1D
*
*FOLLOWING IS THE VZERO STACKER
```

```
*
VZERO   CLR     TEMP7    0 TO EOL COUNT
        LDA     $43
        STA     Y+       INST TO STACK
        ASL     RES      SHIFT RESIDUE LEFT
        ROLB
        ROL     RESZER   KEEP TRACK OF ZEROES SHIFTED OFF FOR EOL
        DEC     RESCT
        BNE     VZEROA   TEST FOR COUNT =0
        STB     TEMP1    KEEP B FOR UNPACK SUBROUTINE
        LBSR    PAKUP2
VZEROA  COM     COLOR
        DEC     MIFCT    TEST FOR LAST INSTRUCTION IN BEFFER
        BNE     TWODEC
        LBSR    UPDMAI
        BRA     TWODEC
*
*
*FOLLOWING IS THE VERTICAL ONE PROCEDURE
*
VERT1   CLR     TEMP7    0 TO EOL COUNT
        COM     COLOR
        BITB    $20      TEST FOR VR1
        BEQ     VL1
        LDA     $44      VR1 CODE TO STACK
VRRET1  STA     Y+
        LDA     $03
        LBSR    UNPACK   INC Y, UNPACK 3 BITS
        DEC     MIFCT
        BNE     TWODEC   TEST FOR LAST INST
        LBSR    UPDMAI
        BRA     TWODEC
*
*
*
VL1     LDA     $42      VL1 CODE TO STACK
        BRA     VRRET1
*
*PROCEDURE HORIZ
*THIS SUBROUTINE BRANCHES TO THE 1D DECODE (BLACK OR WHITE)WITH THE
*PROPER VALUES IN THE MAILBOX.FF TO TEMP6,0 TO TCNT.
*
HORIZ   LDA     $03
        LBSR    UNPACK
        LDA     $FF      2D TO TEMP6
        STA     TEMP6
        COMA
        CLR     TCNT     START TO TCNT
        INCA
        LDA     COLOR    TEST FOR BLACK
        BEQ     AR2BLK
        LBRA    BLA12
AR2BLK  LBRA    WHIT12   WHITE 1D DECODE
*
*FOLLOWING IS THE VERT2 STACKING ROUTINE
*
VERT2   CLR     TEMP7    0 TO EOL COUNT
        COM     COLOR
        BITB    $04      TEST FOR VL2 CODE
        BEQ     VL2
        LDA     $45      VR2 TO INST STACK(45)
VRRET2  STA     Y+
        LDA     $06
        LBSR    UNPACK   UNPACK 6 BITS
        DEC     MIFCT    TEST FOR 64TH INSTRUCTION
        LBNE    TWODEC
        LBSR    UPDMAI   UPDATE INST DMAC
        LBRA    TWODEC
*
*
VL2     LDA     $41      VL2 TO INST STACK
        BRA     VRRET2
```

```
*
*FOLLOWING IS THE VERTICAL 3 PROCEDURE
*
VERT3    CLR     TEMP7     CM TO EOL COUNT
         COM     COLOR
         BITB    $02       TEST FOR LEFT
         BEQ     VL3
         LDA     $46
VERT3A   STA     Y+
         LDA     $07
         LBSR    UNPACK    UNPACK 7 BITS
         DEC     MIFCT     TEST FOR 64TH INSTRUCTION
         LBNE    TWODEC
         LBSR    UPDMAI    UPDATE INST BUF IF LAST INST
         LBRA    TWODEC
*
*
VL3      LDA     $40       VL3 TO INST STACK
         BRA     VERT3A
*
**
*
*STACK PASS
*
PASS     CLR     TEMP7
         LDA     $67       PASS CODE TO STACK
         STA     Y+
         LDA     $04
         LBSR    UNPACK    UNPACK 4 BITS
         DEC     MIFCT
         LBNE    TWODEC
         LBSR    UPDMAI
         LBRA    TWODEC
***************************************************************
*
*PROCEDURE ASCII PRINT
*THIS PROGRAM COUSES ASCII CHARACTERS TO BE PRINTED.
*A STRING OF 1 TO 256 CHARACTERS IS INPUT FROM THE CENTRAL CONTROLLER
*THIS PROGRAM TAKES THIS STRING, EXECUTES A LOOKUP FOR THE DOT PATTERN
*AND STACKKS THE DOT S FOR THE LINE IN RAM.AFTER THIS THE DOT
*PATTERN IS RUN THROUGH THE INTERFACE CONTR VIA  .
*FIRST AND LAST LINES ARE EXCEPTIONS.
*
*FIRST THE SYSTEM IS SETUP FOR ASCC.THIS CONSISTS OF LD U
*W 7(ASCCC);SETTING UP DMAC FOR FIRST BUFFER;RESETTING I/F CTRLR.
*
*FOUR MAJOR MODULES ARE CONTAINED IN THIS PROGRAM
*        -CHARACTER STACKER-STACKS CHS TO 80/LINE OR CR
*        -DOT PATTERN GEN-STACKS 32 DOT PATTERN LINES FOR EA CR LINE
*        -DOT PACKER-PACKS DOT PATTERN FOR DOTS GEN ABOVE
*        -DMA CH 1 CTL(SENDS 108 BYTES OF DOTS TO PRTR)
***************************************************************
*
*FIRST THE PROGRAM IS INITIALIZED AS FOLLOWS
*
ASCPRT   LDU     $0007
         STU     MAILPO
         LDA     $FF
         STA     STARTA    STARTA IS A MAILBOX FOR DMA START
         LDD     $7C4A
         STD     CREG      NSTART,BUS,START I/F,LRC,NSC,NCM
         STB     CREGM     NSTART,BUS,EN I/F,NLRC,SC,NCM
***************************************************************
*PROCEDURE CHARACTER STACKER
*
*THE CHARACTER STACKER FOLLOWING STACKS UP A LINE OF CHARACTERS
*FOR DOT GENERATION.FOLLOWING ARE THE CRITERIA FOR ENDING
*THE CHARACTER STACK:
*        80TH CHARACTER IN LINE
*        CR ENCOUNTERED IN STRING
*        LAST CH IN BUFFER AND NO OTHER BUFFERS FILLED
*
```

```
*SOME MAILBOXES USED FOR INTERFACING TO OTHER MODULES INCLUDE
*       -STKPT1,2,3,4=POINTS TO BASE FOR EACH CHARACTER BUFFER
*       TEMP4=COUNT OF CHARACTERS FOR DOT PATTERN TO STACK(0-80)
*       TEMP5 BASE POINT FOR DOT PATTERN ALGORITHM
*       TEMP7 BASE POINT FOR PRESENT BUFFER CHARACTERS
*       TEMP9 CH CT FOR PRESENT BUFFER(0-255)
*       COUNT-DEC WITH EACH CHARACTER
*       STK1,2,3,4;FF=ASCII STACK FULL,00 EMPTY
*       STKCT1,2,3,4 GIVES TOTAL COUNT FOR EACH OF ABOVE
*       Y IS USED TO KEEP TRACK OF THE POINT IN STACK
*       TEMP1-BUFFER PTR 1,2,3,4
*       TEMP10-BUFFER COUNT 1,2,3,4
*NOTE THAT THE CC I/F PROGRAM SETS STKX TO FF WHILE
*THIS PROGRAM CLEARS STKX. THE PROGRAM WILL NOT PROGRESS UNLESS
*A STKX SHOWS A BUFFER FULL.(TAKES NEXT STKX)
*
****************************************************************
        CLR     LSTFLG  LSTFLG IS USED AT THE END TO FINISH LAST CH LINE
        LDA     STK1
        CMPA    $FF
        LBNE    RESET   IF FIRST STACK EMPTY,QUIT
        LDD     STKPT1
        STD     TEMP7   STACK POINTER
        LDX     $0000
        LDA     STKCT1
        STA     TEMP10
        LDY     $0000
PUTIN   LDA     TEMP10
        LBEQ    RELINE  TEST FOR LAST CH USED
        LDD     TEMP7
        LDA     D,Y     INPUT CHARACTER
        CLR     SCAN
        DEC     TEMP10  TEMP10 CONTAINS CH CT DEC
        STX     TEMP4   TEMP4 CONTAINS NO.CH STACKED
        CMPX    80      TEST FOR 80 CH'S IN STACK
        BEQ     LEAYP1
        STA     CHSTK,X
        LEAX    +1,X
LEAYP1  LEAY    +1,Y
        CMPA    $0D     CR?
        BEQ     DOTPAT
PUTPLS  BRA     PUTIN   STACK NEXT CHARACTER.
****************************************************************
*
*FOLLOWING IS THE DOT PATTERN GENERATION PROGRAM
*MAILBOXES INCLUDE:
*       -TEMP4P  CONTAINS CH COUNT MOVED TO
*       -CHSTK CONTAINS BASE POINT FOR CHARACTERS
*       SCAN CONTAINS SCAN NO. FOR CHAR(32 SCAN LINES)
*
*THE CHARACTER IS PRINTED WITH THE FOLLOWING CHARACTERISTICS
*
*       -10 SCAN LINES OF ALL WHITE
*       -7X11  DOT PATTERN DUPED TO 14X22(VERT-S/W,HORIZ-H/W)
*       -6 PELS OF WHITE TO RIGHT OF CHARACTER
*       64 PELS OF WHITE AT BEGINNING AND END OF LINE
*
DOTPAT  LDA     BUFX0M  TEST IF BUFFER ZER ACTIVE
        LBNE    X0MAV
        LDX     BUFX0   X CONTAINS BASE PTR FOR DOT BUFFER(0-108)
BUFX0   EQU     $0300   108 BYTE BUFFER LOCATION
BUFX1   EQU     $0380   DITTO
SCANBE  LDA     104
        STA     CNTDOT  108 BYTES IN DMA BUFFER
        CLR     RESCT
        LDA     $00
        STA     ,X+
        STA     ,X+
        STA     ,X+
        STA     ,X+     4 BYTES OF ZERO TO LEFT MARGIN
        LDB     $09     TEN SCANS OF WHITE LINE
```

```
        CMPB    SCAN    IF 10 OR LESS SCANS FILL BUFFER WITH ZEROES
        LBGE    ZERSCN
        LDB     TEMP4P  GET CHARACTER COUNT
        STB     CHDCT
*
*AT THIS POINT THE TEN LINES OF ZEROES AND THE LEFT MARGIN
*ARE STACKED.  WE THEN LOOK UP THE CHARACTERS IN ORDER.(1-80)
*A DOT PATTERN LOOKUP IS DONE ON THE CHARACTERS WITH THE ADDRESS FOR
*THE LOOKUP GENERATED AS FOLLOWS:
*       -A0-A6=ASCIICHARACTER
*       -A7-A10=SCAN   (0-10)NOTE THIS IS THE SCAN  IN CH
*       -A15-A11 ASCIDM-F000-F5FF(F000-F5FF=LOOKUP TABLE AREA)
*LOOKS FOR CR OR 80TH CHARACTER.ILLEGAL CH ARE IGNORED.
*****************************************************************
        LDD     CHSTK
        CLR     RESCT   LOAD BASE POINT FOR CH STACK AND 0 TO RESCT
        STD     DOTCH
REDOTA  LDB     [DOTCH] GET THE CHARACTER
        CLRA
        STD     CHARMM
        CMPB    $0D     TEST FOR CR
        LBEQ    ZERSCP
        LDA     SCAN    SCAN   TO A
        SUBA    $0A     -10 FORM A
        CLRB
        LSRA            DIVIDE SCAN BY TWO FOR TWIN SCAN
        LSRA
        RORB            THESE = "LSRD"
        ORA     CHARMM
        ORB     CHARMP
        TFR     D,U
        LDB     ASCIDM,U        DOT PATTERN TO B
        LDA     RESCT
        CMPA    $00
        BEQ     DPAK0
        CMPA    $02
        BEQ     DPAK2
        CMPA    $04
        BEQ     DPAK4
        BRA     DPAK6
*****************************************************************
RETDOT  INC     DOTCHL
        DEC     CHDCT
        BEQ     ZERSCP
        BRA     REDOTA  INC CH PTR,DEC CH CT,IF ZERO FINISH LINE
*****************************************************************
*
*FOLLOWING ARE THE DOT PACKER ROUTINES
*       -DPAK0 ;RESCT=0-2
*       -DPAK2 ;2-4
*       -DPAK4 ;4-6
*       -DPAK6 ;RESCT 6-0
*INPUTS RESCT.RES
*****************************************************************
*
DPAK0   DEC CNTDOT
        STB     X       LOOKUP TO STACK
        CLR     RES
        LEAX    +1,X
        LDA     $02
        STA     RESCT   2 TO RESCT
        BRA     RETDOT
*
*
DPAK2   LDA     $40     SHIFT BY 6
        MUL
        ORA     RES     DOT PATTERN
        STB     RES     NEW RESIDUE
        STA     X
        LEAX    +1,X
        LDA     $04     4 TO RESIDUE COUNT
        STA     RESCT
```

```
              DEC      CNTDOT
              BRA      RETDOT
* *
* *
DPAK4   LDA      $10        SHIFT BY 4
        MUL
        ORA      RES        DOT PATTERN
        STB      RES        NEW RESIDUE
        STA      X
        LEAX     +1,X
        LDA      $06        6 TO RESIDUE COUNT
        DEC      CNTDOT
        STA      RESCT
        BRA      RETDOT
*        *
*        *
DPAK6   LDA      $04        SHIFT BY 2
        MUL
        ORA      RES        DOT PATTERN
        STA      X
        LEAX     +1,X
        STB      X
        LEAX     +1,X
        CLR      RESCT
        DEC      CNTDOT
        DEC      CNTDOT
        BRA      RETDOT     STACK NEXT CH DOTS
*
*USE BUFFER 1 FOR OUTPUTTING INSTRUCTIONS
*
XOMAV   LDX      BUFX1
        LBRA     SCANBE
***************************************************************
*
*PROCEDURE ZERSCN
*AT THIS POINT IN THE ASCII GENERATION THE PROGRAM HAS DECIDED
*TO FILLUP THE PRESENT SCAN LINE WITH ALL ZEROES
*CNTDOT IS DECREMENTED WHILE X IS INCREMENTED
*WHEN BUFFER IS FINISHED THE PROGRAM CHECKS DMAC FOR BUSY
*IF NOT BUSY THE DMAC IS STARTED ON THIS BUFFER. IF BUSY
*THE PROGRAM WAITS FOR DMAC TO COMPLETE.NOTE THAT THIS
*PROGRAM IS NOT AN INTERRUPT DRIVEN PROGRAM BUT RATHER A
*POLLING PROGRAM. INTERRUPTS ARE DISABLED IN THE DMAC.
*
***************************************************************
*
ZERSCP  LDA      RESCT
        BEQ      ZERSCN     TEST FOR NO RESIDUE
        LDA      RES
        STA      ,X+
        DEC      CNTDOT
ZERSCN  LDA      $00
        STA      ,X
        LEAX     +1,X       INC STACK
        DEC      CNTDOT
        BNE      ZERSCN
*
*THE DMAC IS TESTED FOR ACTIVITY. IF INACTIVE THE DMAC IS STARTED.
*AN EOL IS ALSO FORCED THROUGH THE INTERFACE CONTROLLER.
*
        LDA      STARTA     TEST FOR INITIAL CYCLE
        BNE      STRDOT
        LDU      1          MAIL FOR 1ST CYCLE
TESTAG  LDA      DMABL1     TEST FOR BYTE COUNT ZERO
        BNE      TESTAG
        LDA      CREGM      GET CONTENTS OF CREG
        ORA      $04        FORCE LRC BIT
        STA      CREG
        LDA      CREGM
        STA      CREG       THIS FORCES LR AND GOOD DATAIN ASCII MODE
* *
```

```
*  *THE DMAC IS SETUP; BYTE COUNT =108,ADDRESS =BASE PT. OF X
*  *ADDRESS UP,TSC,STEAL,READ
*  *IRQ  1 DISABLED
*  *FIXED PRIORITY, EN CH1
*  *
STRDOT   CLR       DMAP
         TFR       X,D      X TO D
         ANDB      $80
         STD       DMAAH1   ADDRESS TO DMAC
         LDD       108
         STD       DMABH1   108 TO BYTE COUNT
         CLR       DMAI
         CLR       DMADC
         LDA       $05      ADDR UP, TSC STEAL;READ
         STA       DMAC1
         LDA       $02      ENABLE CHANNEL1
         STA       DMAP
         CMPU      0        TEST FOR SECOND CYCLE
         BEQ       ARDMAD
         LDU       0
         INC       SCAN
         BRA       TESTAG   RESTART DMAC
ARDMAD   LDB       BUFX0M
         BITB      $80      TEST FOR BIT7=1(1 MEANS BUFX1 ACTIVE;0=BUFX0)
         BNE       DBUF1
         LDA       $FF
         STA       BUFX0M   MAILBOX=FF(BUFX0M)BUFX0 ACTIVE
         CLR       BUFX1M
         LDX       BUFX1    SET BUFX1 TO PTR FOR NEXT DOT STRING
REINC    INC       SCAN
         CLR       STARTA
         LDA       32
         CMPA      SCAN
         LBGT      SCANBE   SCAN NEXT DOT LINE
         LDX       $0000    X CLEARED FOR NEXT SCAN
         LBRA      PUTEST   LINE SCANNED
*
*
*
DBUF1    LDA       $FF
         STA       BUFX1M   BUFFER 1 ACTIVE
         CLR       BUFX0M
         LDX       BUFX0
         BRA       REINC
*
*
*AT THIS POINT THE PRESENT STACK OF ASCII CHARACTERS HAS BEEN
*USED. THE NEXT STACK IS BROUGHT UP, THE PARAMETERS FOR THE STACKIN ARE UPDATED
  STPTR(TEMP7)
*
RELINE   LDY       $0000    ZERO TO Y-CHARACTER PTR(CH STACKER)
RELINP   LDD       TEMP7
         CMPD      STKPT1   IN STACK 1?
         BEQ       NEXC2
         CMPD      STKPT2
         BEQ       NEXC3    GO TO NEXT=3
         CMPD      STKPT3
         BEQ       NEXC4    GO TO NEXT=4
         CLR       STK4
         LDA       STK1     STACK FULL?
         BEQ       ENDPRT
NEXC1    LDD       STKPT1
         STD       TEMP7    PTR1 TO STACK BASE
         LDA       STKCT1
         STA       TEMP10   CT1 TO TEMP10
         LBRA      PUTPLS
*
NEXC2    CLR       STK1
         LDA       STK2
         BEQ       ENDPRT   IF 0 GO  TO END
         LDD       STKPT2
```

```
               STD     TEMP7
               LDA     STKCT2
               STA     TEMP10   CT2 TO TEMP10
               LBRA    PUTPLS
*
NEXC3          CLR     STK2
               LDA     STK3
               BEQ     ENDPRT   IF 0 GO TO END
               LDD     STKPT3
               STD     TEMP7    PTR 3 TO STACK BASE
               LDA     STKCT3
               STA     TEMP10   CT3 TO TEMP10
               LBRA    PUTPLS
*
NEXC4          CLR     STK3
               LDA     STK4
               BEQ     ENDPRT   TEST FOR STACK ACTIVE
               LDD     STKPT4
               STD     TEMP7    PT4 TO STACK BASE
               LDA     STKCT4
               STA     TEMP10   CT4 TO TEMP10
               LBRA    PUTPLS
*
*
*THIS CODE LOOKS FOR THE LSTFLG SET. IF SET THEN WE GO TO DOTPAT
*IF NOT WAI,THEN GO TO DOTPAT OR RELINE.(6850 IRQ)
*THEN GO TO DOTPAT OR RELINE.
*STATE=BUFFERS OVERRUN.
*TO GET HERE NO BUFFERS AVAILABLEBUT POSSIBLY IN MIDDLE OF LINE OF
*STACKED CHARACTERS
*
ENDPRT         LDA     LSTFLG   TEST FOR END
               BLT     ENDFLS
               LDA     WTMAIL   TEST FOR BUFFER PENDING(FF-PENDING)
               BGE     EDWAIT
               CLR     WTMAIL
               LDA     $07      ECHO 07
               STA     ACID
EDWAIT         CWAI    $AF
               LDA     LSTFLG   TEST FOR END
               BLT     ENDFLS
IGNORK         LBRA    RELINP
*
*************************************************************
*PROCEDURE PUTEST
*AT THIS POINT A STRING OF CHARACTER DOT PATTERNS HAVE BEEN PRINTED
*WE TEST IF THIS WAS THE FINAL STRING. (ENDFLG SET)
*RETURN TO IDLE IF PRESENT BUFFER EMPTY.
*THIS IS TESTED BY CHECKING TO SEE IF THE DMAC IS ACTIVE.
*IF NOT AT END CONTINUE STACKING AND PRINTING CHARACTERS
*
*GGGGGGGGGGGGGGGGGGGGGGGGGGGGGGGGGGGGGGGGGGGGGGGGGGGGGGGGGGGGGG
PUTEST         LDA     ENDFLG
               BLT     GORES    TEST FOR END,
               CLR     TEMP4P
               LBRA    PUTIN    IF NOT END CONTINUE PRINTING
GORES          LDA     DMABL1   WAIT FOR DMAC INACTIVE
               BNE     GORES
               LDA     $0A      ECHO ENDASCII CODE AT END OF BUFFER
               STA     ACID
               LBRA    RESET    WHEN FINISHED RETURN TO RESET
*
*************************************************************
*TO GET HERE, NO BUFFERS AND LSTFLG SET.CAN BE A LINE OF CHARACTERS
*REMAINING.
*
*************************************************************
ENDFLS         COM     ENDFLG
               CLR     SCAN
               LDA     TEMP4P   IF ZERO THERE ARE NO CHARACTERS REMAINING
               BEQ     GORES
               INC     TEMP4P
```

```
        LBRA    DOTPAT
*
*****************************************************************
*FOLLOWING IS THE ENDASCII CODE. TO GET HERE THE CC MUST SEND AN
*END ASCII INSTRUCTION-0A.LSTFLG IS SET BY THIS ROUTINE.
*
*IIIIIIIIIIIIIIIIIIIIIIIIIIIIIIIIIIIIIIIIIIIIIIIIIIIIIIIIIIIIIIII
ENDASC  ORCC    $FF     DISABLE INTERRUPTS
        LDA     $FF
        STA     LSTFLG  SET LSTFLG ACTIVE
        RTI
*
STKPT1  EQU     $0400
STKPT2  EQU     $0500
STKPT3  EQU     $0600
STKPT4  EQU     $0700
*0000000000000000000000000000000000000000000000000000000000000000
        INCLUDE SSDDP.SRC
        INCLUDE MARY1
        INCLUDE ASCII

*
*MIKE FEDDE-AUTHOR
*
*TEST 1D AND 2D  HARDWARE
*
*THIS PROGRAM TESTS THE 2 DIMENSIONAL HARDWARE
*
*TWENTY FOUR TEST PATTERNS ARE USED FOR 2D TEST
*FOLLOWING ARE THE TEST PATTERNS
*       1.BEGIN LINE-9
*       2.MID LINE-7
*       3.END LINE-8
*
*
*
        ORG     $FCA0
DIRTST  ANDCC   $EF     ENABLE IRQ
        CLR     DMAP
        LDA     DMAC1
        LDA     TESTNO
        LBEQ    MEMTST  MEM TEST DOES NOT YET EXIST
        DEC     TESTNO  DECREMENT TEST NO. FOR PROPER OPERATION
BEGIN   LDD     $5864
        STA     CONT    RESTART TO INTERFACE CONT REG
        STB     CREG    START ENGINE TO CONT REG
        STA     CONT    CLEAR FLAG
        LDD     $0141
        STD     CREG    ENABLE INT CONT _TERM CNT =9
        STB     CREGM
        CLRA
        LDB     TESTNO  TESTNO CONTAINS POINTER FOR TEST TO BE DONE
        TFR     D,Y     HOLD TEST    IN INDEX REG
        ASLB            ALL TEST NMBRS ARE 2 BYTE FIELDS
        TFR     D,U
        LDX     TSTYPE,U        TEST START ADDRESS
        LDB     LENGTH,Y
        STB     MAILNG          LENGTH PTR ADDRESS
        LDY     $0600
RELD    LDA     X+      LOOP UNTIL 1 TEST IS XFRRED TO 0600
        STA     Y+
        DECB
        BNE     RELD
*WE ARE NOW READY TO SET UP THE DMAC
*ADDRESS POINTER AT $0600
MAILNG  EQU     $02C2
        LDD     $0600
        STD     DMAAH1  BASE POINTER TO DMAC
        LDA     $00
        STA     DMAI    DISABLE FIRQ
        LDA     $05
```

```
          STA     DMAC1       TSC,READ TRANSFER DATA TO CHAN 1 ENGINE
          LDB     MAILNG
          CLRA
          STD     DMABH1      LENGTH TO BYTE COUNT
          CLR     DMADC
          LDA     $02
          STA     DMAP
TESTIN    LDA     DMABL1      TEST FOR BYTE COUNT=0
          BNE     ARENDF
          BSR     FIRQEM
ARENDF    BRA     TESTIN
*         *
*         *
FIRQEM    CLR     DMAP        CANCELS DMA SEQUENCE
          LDA     DMAC1       CLEARS DMA IRQ FLAG
          LDD     $0600
          STD     DMAAH1      BASE ADDRESS TO POINTER
          LDB     MAILNG
          STB     DMABL1
          LDA     $02
          STA     DMAP
          RTS
*
*
*
TSTYPE    FDB     TB1,TB2D1,TB2D2,TB2D3    TEST 0,1,2,3
          FDB     TB3,TB4D1,TB4D2,TB4D3    TEST 4,5,6,7
          FDB     TB5,TVL3,TVL2,TVL1       TEST 8,9,10,11
          FDB     TVR1,TVR2,TVR3,TPASS     TEST 12,13,14,15
          FDB     TE1,TE2,TE3,TE4          TEST 16,17,18,19
          FDB     TE5,TE6,TE7,TE8          TEST 20,21,22,23
          FDB     LFTSTR,ALLBLK,DAGRS,OWEB,EWOB  TEST 24,25,26,27,28
          FDB     QUILT                    TEST29
*
*
LENGTH    FCB     53,11,11,11
          FCB     12,11,11,11
          FCB     13,9,9,9
          FCB     9,9,9,12
          FCB     11,10,8,8
          FCB     10,8,8,11
          FCB     10,4,150,60,61,56
*
*
*FOLLOWING ARE THE SEQUENCE OF INSTRUCTIONS TO BE SENT TO THE I/F
*TO TEST VARIOUS ASPECTS OF THE INTERFACE CONTROLLER IN 2D MODE.
*
TB1       FCB     $99,00,4,4,4,4,4,4
          FCB     4,4,4,4,4,4,4,4
          FCB     4,4,4,4,4,4,4,4
          FCB     4,4,4,4,4,4,4,4
          FCB     4,4,$58,$43,$43,$43,$43,$43
          FCB     $43,$43,$43,$43,$43,$43,$43,$43
          FCB     $43,$43,$43,$43,$58
*
TB2D1     FCB     1,7,56,$9A
          FCB     0,$58,$42,$43
          FCB     $43,$43,$58
*
TB2D2     FCB     2,6,56,$9A
          FCB     0,$58,$41,$43
          FCB     $43,$43,$58
*
TB2D3     FCB     3,5,56,$9A
          FCB     0,$58,$40,$43
          FCB     $43,$43,$58
*
TB3       FCB     0,3,5,56,$9A
          FCB     0,$58,$67,$43
          FCB     $43,$43,$58
*
```

```
TB4D1   FCB     0,8,56,$9A,0
        FCB     $58,$44,$43,$43
        FCB     $43,$58
*
TB4D2   FCB     0,8,56,$9A,0
        FCB     $58,$45,$43,$43
        FCB     $43,$58
*
TB4D3   FCB     0,8,56,$9A
        FCB     0,$58,$46,$43
        FCB     $43,$43,$58
*
TB5     FCB     5,3,56,$9A
        FCB     0,$58,0,3
        FCB     $44,$43,$43,$43
        FCB     $58
*
TVL3    FCB     8,56,$9A,0
        FCB     $58,$40,$40,$43
        FCB     $58
*
TVL2    FCB     8,56,$9A,0
        FCB     $58,$41,$41,$43
        FCB     $58
*
TVL1    FCB     8,56,$9A,0
        FCB     $58,$42,$42,$43
        FCB     $58
*
TVR1    FCB     8,56,$9A,0
        FCB     $58,$44,$44,$43
        FCB     $58
*
TVR2    FCB     8,56,$9A,0
        FCB     $58,$45,$45,$43
        FCB     $58
*
TVR3    FCB     8,56,$9A,0
        FCB     $58,$46,$46,$43
        FCB     $58
*
TPASS   FCB     4,1,3,56
        FCB     $9A,0,$58,$67
        FCB     $43,$43,$43,$58
*
TE1     FCB     0,$9A,0,60,4
        FCB     $58,$43,$43,$43,$43
        FCB     $58
*
TE2     FCB     0,$9A,59,5
        FCB     $58,$43,$43,$41,$43
        FCB     $58
*
TE3     FCB     $9A,60,2,2
        FCB     $58,$43,$45,$58
*
TE4     FCB     $9A,60,4,$58
        FCB     $43,$41,$43,$58
*
TE5     FCB     $9A,0,59,2
        FCB     3,$58,$43,$43
        FCB     $46,$58
*
TE6     FCB     $9A,61,2,1
        FCB     $58,$67,$43,$58
*
TE7     FCB     $9A,58,6,$58
        FCB     $43,3,3,$58
*
TE8     FCB     0,$9A,59,1,4
        FCB     $58,$43,$43,5,0,$58
*
```

```
LFTSTR  FCB     0,1,1,$81,1,1
        FCB     $3C,$99,0,$58
*
ALLBLK  FCB     0,$9B,0,$58
*
DAGRS   FCB     $3B,$3C,$3D,$3E,$3F,$3B,$3C,$3D,$3E,$3F,$91,$1E,$58,$81,$00
        FCB     $9A
        FCB     $00,$58,$82,$00,$99,$0,$58,$83,0,$98,0,$58,$84,0,$97,0
        FCB     $58,$85,0,$96,0,$58,$86,0,$95,0,$58,$87,0,$94,0,$58
        FCB     $88,0,$93,$0,$58,$89,$0,$92,$0,$58,$8A,$0,$91,$0,$58,$8B
        FCB     0,$90,$0,$58,$8C,$0,$8F,$0,$58,$8D,$0,$8E,0,$58,$8E,$00
        FCB     $8D,0,$58,$8F,0,$8C,0,$58,$90,0,$8B,0,$58,$91,0,$8A
        FCB     0,$58,$92,$0,$89,0,$58,$93,$0,$88,0,$58,$94,0,$87,0
        FCB     $58,$95,0,$86,0,$58,$96,0,$85,0,$58,$97,0,$84,0,$58
        FCB     $98,0,$83,$0,$58,$99,0,$82,0,$58,$9A,0,$81,$0,$58,$9B
        FCB     0,$58,0,$9B,0,$58
*
OWEB    FCB     1,2,3,4,5,6,7,8,9,10,11,12,13,14,15,16,17,18,19,20
        FCB     21,22,23,24,25,26,27,28,29,30,31,32,33,34,35,36,37,38,39
        FCB     40,41,42,43,44,45,46,47,48,49,50,51,52,53,54,55,56,57,58
        FCB     17,$58
*
EWOB    FCB     0,1,2,3,4,5,6,7,8,9,10,11,12,13,14,15,16,17,18,19,20
        FCB     21,22,23,24,25,26,27,28,29,30,31,32,33,34,35,36,37,38,39
        FCB     40,41,42,43,44,45,46,47,48,49,50,51,52,53,54,55,56,57,58
        FCB     17,$58
*
*
        ORG     $F900   NOTE THIS CODE TO NOT EXCEED F980
*
*
QUILT   FCB     $81,0,$81,0,$81,0,$82,0,$84,0,$83,0,$83,0,$84
        FCB     0,$84,$0,$20,$83,0,$20,$58
        FCB     $40,$01,$02,$46,$03,$04,$41,$05,$06,$45,$83
        FCB     $00,$07,$42,$08,$09,$44,$0A,$81,$00,$43
        FCB     $81,$00,$0C,$43,$67,$81,$00,$81,$00,$43,$43
        FCB     $58

END
ASCIDM  EQU     $FC00
        ORG     $FC20
        FCB     $00,$10,$48,$28,$10,$40
        FCB     $70,$18,$08,$20,$00,$00
        FCB     $00,$00,$00,$00,$7C,$10
        FCB     $7C,$7C,$04,$FE,$3C,$FE
        FCB     $7C,$7C,$00,$00,$08,$00
        FCB     $20,$3C,$3C,$38,$FC,$3C
        FCB     $F8,$FE,$FE,$3C,$82,$7C
        FCB     $3E,$82,$80,$82,$82,$38
        FCB     $FC,$38,$FC,$7C,$FE,$82
        FCB     $82,$82,$82,$82,$FE,$78
        FCB     $00,$78,$10,$00,$30,$00
        FCB     $80,$00,$04,$00,$18,$00
        FCB     $80,$00,$00,$80,$30,$00
        FCB     $00,$00,$00,$00,$00,$00
        FCB     $00,$00,$00,$00,$00,$00
        FCB     $00,$18,$10,$30,$60
        ORG     $FCA0
        FCB     $00,$10,$48,$28,$7E,$A2
        FCB     $88,$18,$10,$10,$10,$10
        FCB     $00,$00,$00,$02,$82,$30
        FCB     $82,$82,$0C,$80,$40,$82
        FCB     $82,$82,$00,$00,$10,$00
        FCB     $10,$42,$42,$44,$42,$42
        FCB     $44,$80,$80,$42,$82,$10
        FCB     $08,$84,$80,$C6,$C2,$44
        FCB     $82,$44,$82,$82,$10,$82
        FCB     $82,$82,$82,$82,$02,$40
        FCB     $80,$08,$28,$00,$30,$00
        FCB     $80,$00,$04,$00,$24,$00
        FCB     $80,$10,$04,$80,$10,$00
```

```
FCB     $00,$00,$00,$00,$00,$00
FCB     $20,$00,$00,$00,$00,$00
FCB     $00,$20,$10,$08,$92
ORG     $F120
FCB     $00,$10,$48,$28,$90,$44
FCB     $88,$10,$20,$08,$92,$10
FCB     $00,$00,$00,$04,$86,$50
FCB     $02,$02,$14,$80,$90,$04
FCB     $82,$82,$00,$00,$20,$00
FCB     $08,$42,$9A,$82,$42,$80
FCB     $42,$80,$80,$80,$82,$10
FCB     $08,$88,$80,$AA,$A2,$82
FCB     $82,$82,$82,$80,$10,$82
FCB     $82,$92,$44,$44,$04,$40
FCB     $40,$08,$44,$00,$10,$00
FCB     $80,$00,$04,$00,$20,$00
FCB     $80,$00,$00,$80,$10,$00
FCB     $00,$00,$00,$00,$00,$00
FCB     $20,$00,$00,$00,$00,$00
FCB     $00,$20,$10,$08,$0C
ORG     $F1A0
FCB     $00,$10,$00,$FE,$90,$08
FCB     $50,$20,$20,$08,$54,$10
FCB     $00,$00,$00,$08,$8A,$10
FCB     $04,$02,$24,$F8,$80,$08
FCB     $82,$82,$30,$30,$40,$7C
FCB     $04,$02,$AA,$82,$42,$80
FCB     $42,$80,$80,$80,$82,$10
FCB     $08,$90,$80,$92,$92,$82
FCB     $82,$82,$82,$80,$10,$82
FCB     $44,$82,$28,$28,$08,$40
FCB     $20,$08,$92,$00,$08,$78
FCB     $B8,$78,$74,$78,$20,$74
FCB     $B8,$30,$0C,$88,$10,$EC
FCB     $B8,$78,$B0,$74,$B8,$78
FCB     $F8,$84,$82,$82,$84,$84
FCB     $FC,$20,$00,$08,$00
ORG     $F220
FCB     $00,$00,$00,$28,$7C,$10
FCB     $20,$00,$20,$08,$38,$FE
FCB     $00,$FE,$00,$10,$92,$10
FCB     $38,$3C,$44,$04,$FC,$10
FCB     $7C,$7E,$30,$30,$80,$00
FCB     $02,$0C,$AA,$82,$7C,$80
FCB     $42,$F0,$F0,$80,$FE,$10
FCB     $08,$A0,$80,$92,$8A,$82
FCB     $FC,$82,$FC,$7C,$10,$82
FCB     $44,$92,$10,$10,$10,$40
FCB     $10,$08,$00,$00,$00,$04
FCB     $C4,$84,$8C,$84,$F8,$8C
FCB     $C4,$10,$04,$90,$10,$92
FCB     $C4,$84,$C8,$8C,$C4,$84
FCB     $20,$84,$92,$92,$40,$84
FCB     $08,$40,$00,$04,$00
ORG     $F2A0
FCB     $00,$00,$00,$FE,$12,$24
FCB     $52,$00,$20,$08,$54,$10
FCB     $00,$00,$00,$20,$A2,$10
FCB     $40,$02,$84,$02,$82,$20
FCB     $82,$02,$00,$00,$40,$7C
FCB     $04,$10,$BC,$FE,$42,$80
FCB     $42,$80,$80,$9E,$82,$10
FCB     $08,$D0,$80,$82,$86,$82
FCB     $80,$92,$90,$02,$10,$82
FCB     $28,$92,$28,$10,$20,$40
FCB     $08,$08,$00,$00,$00,$7C
FCB     $84,$80,$84,$FC,$20,$84
FCB     $84,$10,$04,$A0,$10,$92
FCB     $84,$84,$88,$84,$80,$60
FCB     $20,$84,$82,$92,$30,$84
FCB     $10,$20,$10,$08,$00
ORG     $F320
FCB     $00,$10,$00,$28,$12,$4A
FCB     $8C,$00,$20,$08,$92,$10
FCB     $30,$00,$00,$40,$C2,$10
FCB     $80,$02,$FE,$02,$92,$20
FCB     $82,$02,$00,$00,$20,$00
FCB     $08,$10,$80,$82,$42,$80
FCB     $42,$80,$80,$82,$82,$10
FCB     $08,$88,$90,$82,$92,$82
FCB     $90,$8A,$88,$02,$10,$82
FCB     $28,$AA,$44,$10,$40,$40
FCB     $04,$08,$00,$00,$00,$84
FCB     $84,$80,$84,$80,$20,$8C
FCB     $84,$10,$04,$D0,$10,$92
FCB     $84,$84,$C8,$8C,$80,$18
FCB     $20,$84,$44,$92,$30,$8C
FCB     $20,$20,$10,$08,$00
ORG     $F3A0
FCB     $00,$10,$00,$28,$FC,$84
FCB     $8C,$00,$10,$10,$10,$10
FCB     $30,$00,$30,$80,$82,$10
FCB     $80,$02,$04,$84,$82,$20
FCB     $82,$04,$30,$30,$10,$00
FCB     $10,$00,$40,$82,$42,$42
FCB     $44,$80,$80,$42,$82,$10
FCB     $88,$84,$80,$82,$82,$44
FCB     $80,$44,$84,$82,$10,$82
FCB     $10,$C6,$82,$10,$80,$40
FCB     $02,$08,$00,$00,$00,$84
FCB     $C4,$84,$8C,$80,$20,$74
FCB     $84,$10,$04,$88,$10,$92
FCB     $84,$84,$B0,$74,$80,$84
FCB     $24,$8C,$28,$92,$48,$74
FCB     $40,$20,$10,$08,$00
ORG     $F420
FCB     $00,$00,$00,$28,$10,$00
FCB     $72,$00,$08,$20,$00,$00
FCB     $20,$00,$30,$00,$7C,$7C
FCB     $FE,$FC,$04,$78,$7C,$20
FCB     $7C,$78,$30,$30,$08,$00
FCB     $20,$10,$3E,$82,$FC,$3C
FCB     $F8,$FE,$80,$3C,$82,$7C
FCB     $70,$82,$FE,$82,$82,$38
FCB     $80,$3A,$82,$7C,$10,$7C
FCB     $10,$82,$92,$10,$FE,$78
FCB     $00,$78,$00,$00,$00,$7A
FCB     $B8,$78,$74,$78,$20,$04
FCB     $84,$38,$04,$84,$38,$92
FCB     $84,$78,$80,$04,$80,$78
FCB     $18,$74,$10,$6C,$84,$04
FCB     $FC,$18,$00,$30,$00
ORG     $F4A0
FCB     $00,$00,$00,$00,$00,$00
FCB     $00,$00,$00,$00,$00,$00
FCB     $40,$00,$00,$00,$00,$00
FCB     $00,$00,$00,$00,$00,$00
FCB     $00,$00,$00,$20,$00,$00
FCB     $00,$00,$00,$00,$00,$00
FCB     $00,$00,$00,$00,$00,$00
FCB     $00,$00,$00,$00,$00,$00
FCB     $00,$00,$00,$00,$00,$00
FCB     $00,$00,$00,$00,$00,$00
FCB     $00,$00,$00,$00,$00,$84
FCB     $00,$00,$00,$00,$00,$00
FCB     $00,$00,$44,$00,$00,$00
FCB     $00,$00,$80,$00,$04,$00
FCB     $00,$00,$00,$00,$00,$84
FCB     $00,$00,$00,$00,$00
ORG     $F520
FCB     $00,$00,$00,$00,$00,$00
FCB     $00,$00,$00,$00,$00,$00
FCB     $00,$00,$00,$00,$00,$00
FCB     $00,$00,$00,$00,$00,$00
```

```
           FCB    $00,$00,$00,$40,$00,$00              FCB    $05,$05,$05,$05
           FCB    $00,$00,$00,$00,$00,$00              FCB    $05,$05,$05,$05
           FCB    $00,$00,$00,$00,$00,$00              FCB    $0E,$0E,$0E,$0E
           FCB    $00,$00,$00,$00,$00,$00              FCB    $0F,$0F,$0F,$0F
           FCB    $00,$00,$00,$00,$00,$00      5       FCB    $81,$81,$81,$81
           FCB    $00,$00,$00,$00,$00,$00              FCB    $81,$81,$81,$81
           FCB    $00,$00,$00,$FE,$00,$00              FCB    $06,$06,$06,$06
           FCB    $00,$00,$00,$00,$00,$78              FCB    $06,$06,$06,$06
           FCB    $00,$00,$38,$00,$00,$00              FCB    $06,$06,$06,$06
           FCB    $00,$00,$80,$04,$00,$00     10       FCB    $06,$06,$06,$06
           FCB    $00,$00,$00,$00,$00,$78              FCB    $07,$07,$07,$07
           FCB    $00,$00,$00,$00,$00                  FCB    $07,$07,$07,$07
                                                       FCB    $07,$07,$07,$07
EX                                                     FCB    $07,$07,$07,$07
*LOOKUP1 L1                                 15  *      *
*                                               *      *
LU1L1W     EQU    $F680                        *      *
           ORG    $F680                        *      *LU2 L1 WHITE
           FCB    $FF,$FF,$1D,$1E              *      *
           FCB    $2D,$2E,$16,$16             20  LU2L1W EQU    $F780
           FCB    $17,$17,$2F,$30                     ORG    $F700
           FCB    $0D,$0D,$0D,$0D                     FCB    $FF,$FF,$FF,$FF
           FCB    $14,$14,$21,$22                     FCB    $FF,$FF,$FF,$FF
           FCB    $23,$24,$25,$26                     FCB    $FF,$FF,$FF,$FF
           FCB    $13,$13,$1F,$20             25      FCB    $FF,$FF,$FF,$FF
           FCB    $01,$01,$01,$01                     FCB    $FF,$FF,$FF,$FF
           FCB    $0C,$0C,$0C,$0C                     FCB    $FF,$FF,$FF,$FF
           FCB    $35,$36,$1A,$1A                     FCB    $97,$98,$99,$9B
           FCB    $27,$28,$29,$2A                     FCB    $FF,$FF,$FF,$FF
           FCB    $2B,$2C,$15,$15             30      FCB    $FF,$FF,$FF,$FF
           FCB    $1C,$1C,$3D,$3E                     FCB    $FF,$FF,$FF,$FF
           FCB    $3F,$00,$85,$86                     FCB    $FF,$FF,$FF,$FF
           FCB    $0A,$0A,$0A,$0A                     FCB    $FF,$FF,$FF,$FF
           FCB    $0A,$0A,$0A,$0A                     FCB    $FF,$FF,$FF,$FF
           FCB    $0B,$0B,$0B,$0B             35      FCB    $FF,$FF,$FF,$FF
           FCB    $0B,$0B,$0B,$0B                     FCB    $FF,$FF,$FF,$FF
           FCB    $1B,$1B,$3B,$3C                     FCB    $FF,$FF,$FF,$FF
           FCB    $FF,$FF,$12,$12                     FCB    $FF,$FF,$FF,$FF
           FCB    $18,$18,$31,$32                     FCB    $FF,$FF,$FF,$FF
           FCB    $33,$34,$19,$19                     FCB    $FF,$FF,$FF,$FF
           FCB    $37,$38,$39,$3A             40      FCB    $8B,$8C,$FF,$FF
           FCB    $83,$83,$83,$83                     FCB    $FF,$FF,$8D,$8E
           FCB    $9A,$9A,$9A,$9A                     FCB    $8F,$90,$91,$92
           FCB    $87,$88,$FF,$8A                     FCB    $93,$94,$95,$96
           FCB    $89,$FF,$FF,$FF                     FCB    $FF,$FF,$FF,$FF
           FCB    $FF,$FF,$84,$84             45      FCB    $FF,$FF,$FF,$FF
           FCB    $02,$02,$02,$02                     FCB    $FF,$FF,$FF,$FF
           FCB    $02,$02,$02,$02                     FCB    $FF,$FF,$FF,$FF
           FCB    $02,$02,$02,$02                     FCB    $FF,$FF,$FF,$FF
           FCB    $02,$02,$02,$02                     FCB    $FF,$FF,$FF,$FF
*         *                                   50      FCB    $FF,$FF,$FF,$FF
*         *                                           FCB    $FF,$FF,$FF,$FF
           ORG    $F600                                *
           FCB    $03,$03,$03,$03              *
           FCB    $03,$03,$03,$03                     ORG    $F780
           FCB    $03,$03,$03,$03             55      *
           FCB    $03,$03,$03,$03                     FCB    $FF,$FF,$FF,$FF
           FCB    $82,$82,$82,$82                     FCB    $FF,$FF,$FF,$FF
           FCB    $82,$82,$82,$82                     FCB    $FF,$FF,$FF,$FF
           FCB    $08,$08,$08,$08                     FCB    $FF,$FF,$FF,$FF
           FCB    $08,$08,$08,$08                     FCB    $FF,$FF,$FF,$FF
           FCB    $09,$09,$09,$09             60      FCB    $FF,$FF,$FF,$FF
           FCB    $09,$09,$09,$09                     FCB    $FF,$FF,$FF,$FF
           FCB    $10,$10,$10,$10                     FCB    $FF,$FF,$FF,$FF
           FCB    $11,$11,$11,$11                     FCB    $FF,$FF,$FF,$FF
           FCB    $04,$04,$04,$04                     FCB    $FF,$FF,$FF,$FF
           FCB    $04,$04,$04,$04             65      FCB    $FF,$FF,$FF,$FF
           FCB    $04,$04,$04,$04                     FCB    $FF,$FF,$FF,$FF
           FCB    $04,$04,$04,$04                     FCB    $FF,$FF,$FF,$FF
           FCB    $05,$05,$05,$05                     FCB    $FF,$FF,$FF,$FF
           FCB    $05,$05,$05,$05                     FCB    $FF,$FF,$FF,$FF
```

```
            FCB   $FF,$FF,$FF,$FF                        FCB   $FF,$FF,$FF,$FF
*     *                                                  FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF        5                FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF       10                FCB   $FF,$FF,$FF,$FF
            FCB   $FF,$FF,$FF,$FF                        FCB   $82,$83,$1A,$1B
            FCB   $FF,$FF,$FF,$FF                        FCB   $1C,$1D,$13,$13
            FCB   $FF,$FF,$FF,$FF                        FCB   $14,$14,$22,$23
            FCB   $FF,$FF,$FF,$FF                        FCB   $24,$25,$26,$27
            FCB   $FF,$FF,$FF,$FF       15                FCB   $15,$15,$2A,$2B
            FCB   $FF,$FF,$FF,$FF                        FCB   $00,$00,$00,$00
            FCB   $FF,$FF,$FF,$FF                        FCB   $FF,$FF,$FF,$FF
*     *                                                  FCB   $FF,$FF,$FF,$FF
*     *NOTE THAT F800 IS SHARED BY                       FCB   $FF,$FF,$FF,$FF
        LU2L1W AND LU3L1B-00            20                FCB   $FF,$FF,$FF,$FF
*     *                                                  FCB   $FF,$FF,$FF,$FF
*     *                                                  FCB   $FF,$FF,$FF,$FF
*     *LU3 L1 BLACK                                      FCB   $FF,$FF,$FF,$FF
*     *                                    *          *
LU3L1B      EQU   $F880                 25 *          *
            ORG   $F880                    *          *
            FCB   $FF,$FF,$FF,$FF          *          *LU4 L1 BLACK
            FCB   $FF,$FF,$FF,$FF          *          *
            FCB   $FF,$FF,$FF,$FF          *          ORG     $FB00
            FCB   $FF,$FF,$FF,$FF       30 *          *
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $12,$12,$12,$12                        FCB   $FF,$FF,$FF,$FF
            FCB   $34,$FF,$FF,$37       35                FCB   $FF,$FF,$FF,$FF
            FCB   $38,$FF,$FF,$3B                        FCB   $FF,$FF,$FF,$FF
            FCB   $3C,$FF,$18,$18                        FCB   $FF,$FF,$FF,$FF
            FCB   $19,$19,$FF,$85                        FCB   $FF,$FF,$FF,$FF
            FCB   $86,$87,$FF,$35                        FCB   $FF,$FF,$FF,$FF
            FCB   $36,$FF,$FF,$FF       40                FCB   $FF,$FF,$FF,$FF
            FCB   $81,$81,$81,$81                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $17,$17,$32,$33       45                FCB   $FF,$FF,$FF,$FF
            FCB   $2C,$2D,$2E,$2F                        FCB   $FF,$FF,$FF,$FF
            FCB   $39,$3A,$3D,$84          *          *
            FCB   $10,$10,$10,$10                        FCB   $FF,$FF,$FF,$FF
            FCB   $11,$11,$11,$11                        FCB   $FF,$FF,$FF,$FF
            FCB   $30,$31,$3E,$3F       50                FCB   $FF,$FF,$FF,$FF
            FCB   $1E,$1F,$20,$21                        FCB   $FF,$FF,$FF,$FF
            FCB   $28,$29,$16,$16                        FCB   $FF,$FF,$FF,$FF
            FCB   $FF,$FF,$FF,$FF                        FCB   $FF,$FF,$FF,$FF
            FCB   $FF,$FF,$FF,$FF                        FCB   $FF,$FF,$FF,$FF
            FCB   $FF,$FF,$FF,$FF       55                FCB   $FF,$FF,$FF,$FF
*     *                                                  FCB   $FF,$FF,$FF,$FF
*     *                                                  FCB   $FF,$FF,$FF,$FF
            ORG   $F800                                  FCB   $FF,$FF,$FF,$FF
*     *                                                  FCB   $FF,$FF,$FF,$FF
            FCB   $FF,$FF,$FF,$FF       60                FCB   $FF,$FF,$FF,$FF
            FCB   $FF,$FF,$FF,$FF                        FCB   $FF,$FF,$FF,$FF
            FCB   $FF,$FF,$FF,$FF          *          *
            FCB   $FF,$FF,$FF,$FF          *          *
            FCB   $FF,$FF,$FF,$FF       65 LU4L1B  EQU   $FB80
            FCB   $FF,$FF,$FF,$FF                  ORG   $FB80
            FCB   $FF,$FF,$FF,$FF                        FCB   $FF,$FF,$FF,$FF
            FCB   $FF,$FF,$FF,$FF                        FCB   $FF,$FF,$FF,$FF
```

```
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                              FCB  $04,$04,$04,$04
            FCB  $FF,$FF,$FF,$FF                   *          *
            FCB  $FF,$FF,$FF,$FF                              ORG     $FA00
            FCB  $FF,$FF,$FF,$FF                   *          *
            FCB  $FF,$FF,$FF,$FF                              FCB  $03,$03,$03,$03
            FCB  $FF,$FF,$FF,$FF                              FCB  $03,$03,$03,$03
            FCB  $FF,$FF,$FF,$FF                              FCB  $03,$03,$03,$03
            FCB  $FF,$FF,$FF,$FF                              FCB  $03,$03,$03,$03
            FCB  $FF,$FF                                      FCB  $03,$03,$03,$03
            FCB  $8A,$8B,$8C,$8D                              FCB  $03,$03,$03,$03
            FCB  $FF,$FF,$FF,$FF                              FCB  $03,$03,$03,$03
            FCB  $94,$95,$96,$97                              FCB  $03,$03,$03,$03
            FCB  $FF,$FF,$FF,$FF                              FCB  $03,$03,$03,$03
            FCB  $98,$99,$FF,$FF                              FCB  $03,$03,$03,$03
            FCB  $FF,$FF,$FF,$FF                              FCB  $03,$03,$03,$03
            FCB  $FF,$FF,$9A,$9B                              FCB  $03,$03,$03,$03
            FCB  $FF,$FF,$FF,$FF                              FCB  $03,$03,$03,$03
            FCB  $FF,$FF,$88,$89                              FCB  $03,$03,$03,$03
            FCB  $FF,$FF,$FF,$FF                              FCB  $03,$03,$03,$03
            FCB  $8E,$8F,$90,$91                              FCB  $02,$02,$02,$02
            FCB  $92,$93,$FF,$FF                              FCB  $02,$02,$02,$02
            FCB  $FF,$FF,$FF,$FF                              FCB  $02,$02,$02,$02
            FCB  $FF,$FF                                      FCB  $02,$02,$02,$02
*           *LOOKUP 1 LEVLEL 2 BLACK                          FCB  $02,$02,$02,$02
*           *                                                 FCB  $02,$02,$02,$02
LU1L2B      EQU      $F980                                    FCB  $02,$02,$02,$02
            ORG      $F980                                    FCB  $02,$02,$02,$02
*           *                                                 FCB  $02,$02,$02,$02
*           *                                                 FCB  $02,$02,$02,$02
            FCB  $00,$03,$02,$02                              FCB  $02,$02,$02,$02
            FCB  $03,$04,$04,$05                              FCB  $02,$02,$02,$02
            FCB  $06,$06,$07,$07                              FCB  $02,$02,$02,$02
            FCB  $07,$08,$08,$00                              FCB  $02,$02,$02,$02
*           *                                                 FCB  $02,$02,$02,$02
*           *                                                 FCB  $02,$02,$02,$02
*           *                                     *           *
*           *LOOKUP1 L1 BLACK                     *           *
*           *                                     *           *
LU1L1B      EQU      $FA80                        *           *LU1 L2 WHITE
            ORG  $FA80                            *           *
            FCB  $FF,$FF,$FF,$FF                  LU1L2W      EQU     $FC00
            FCB  $0D,$FF,$FF,$0E                              ORG     $FC00
            FCB  $0A,$0A,$0B,$0B                              FCB  $08,$06,$04,$04
            FCB  $FF,$FF,$0C,$0C                              FCB  $04,$04,$04,$04
            FCB  $09,$09,$09,$09                              FCB  $05,$05,$05,$05
            FCB  $08,$08,$08,$08                              FCB  $06,$06,$06,$06
            FCB  $07,$07,$07,$07                              FCB  $06,$06,$07,$07
            FCB  $07,$07,$07,$07                              FCB  $07,$07,$07,$07
            FCB  $06,$06,$06,$06                              FCB  $07,$07,$07,$07
            FCB  $06,$06,$06,$06                              FCB  $07,$08,$08,$08
            FCB  $06,$06,$06,$06                              FCB  $08,$08,$08,$08
            FCB  $06,$06,$06,$06                              FCB  $08,$08,$08,$08
            FCB  $05,$05,$05,$05                              FCB  $08,$08,$08,$08
            FCB  $05,$05,$05,$05                              FCB  $08,$08,$08,$08
            FCB  $05,$05,$05,$05                              FCB  $08,$08,$08,$08
            FCB  $05,$05,$05,$05                              FCB  $08,$08,$08,$08
            FCB  $01,$01,$01,$01                              FCB  $08,$08,$08,$08
            FCB  $01,$01,$01,$01                              FCB  $08,$08,$08,$08
            FCB  $01,$01,$01,$01                              FCB  $FF,$05,$05,$06
            FCB  $01,$01,$01,$01                              FCB  $07,$08,$08,$08
            FCB  $01,$01,$01,$01                              FCB  $08,$08,$08,$00
            FCB  $01,$01,$01,$01                              FCB  $00,$00,$00,$00
            FCB  $01,$01,$01,$01                              FCB  $00,$00,$00,$00
            FCB  $01,$01,$01,$01
```

```
        FCB     $00,$00,$00,$00
        FCB     $00,$00,$06,$00
        FCB     $00,$00,$00,$00
*       *
*       *LU3L2B
*       *
LU3L2B  EQU     $FC60
*
        ORG     $FC60
*       *
*       *
        FCB     $06,$00,$00,$00
        FCB     $00,$00,$00,$00
        FCB     $00,$00,$00,$00
        FCB     $00,$00,$00,$00
        FCB     $06,$06,$06,$07
        FCB     $07,$07,$07,$07
        FCB     $07,$07,$08,$08
        FCB     $08,$08,$08,$08
        FCB     $08,$08,$08,$08
        FCB     $08,$08,$08,$08
        FCB     $08,$08,$08,$08
        FCB     $08,$08,$08,$08
        FCB     $08,$08,$08,$08
        FCB     $08,$08,$08,$08
        FCB     $08,$08,$08,$08
        FCB     $08,$08,$08,$08
```

What is claimed is:

1. An apparatus for converting facsimile coded data to video data, comprising:
   a programmed digital computer for receiving said facsimile coded data, buffering said facsimile coded data and converting said facsimile coded data to a fixed length intermediate code; and
   a video convertor responsive to said programmed digital computer for converting said fixed length intermediate code to video data;
   wherein said programmed digital computer comprises:
   a microprocessor capable of executing a series of instructions;
   a read only memory coupled to said microprocessor containing said series of instructions and being capable of supplying said instructions to said microprocessor;
   an interface module for receiving said facsimile coded data;
   a randomly accessible memory coupled to said interface module and to said microprocessor for holding and buffering said facsimile coded data and for holding a table lookup for converting said facsimile coded data to said intermediate code;
   a direct memory access controller coupled to said microprocessor, coupled to said randomly accessible memory, coupled to said interface module and coupled to said video convertor, said direct memory access controller for transferring facsimile coded data from said interface module to said randomly accessible memory and for transferring said intermediate code from said randomly accessible memory to said video convertor, said transferring being under control of said microprocessor.

2. An apparatus as in claim 1 wherein said video convertor comprises:
   an instruction register for receiving said intermediate code;
   a line counter coupled to said instruction register for the number of picture elements in a current line of said facsimile coded data decoding;
   a history memory coupled to said line counter for holding data of the picture elements in a line prior to said current line;
   a shift register coupled to said history memory for holding data of picture elements in said line prior to said current line which is within a predetermined number of picture elements to the current one of said picture elements in said current line;
   vertical logic means coupled to said instruction register and to said shift register, said vertical logic means for determining the vertical correlations between the picture elements within said window with said current one of said picture elements in said current line;
   horizontal logic means coupled to said instruction register, to said history memory and to said vertical logic means, said horizontal logic means for determining the video output data based upon said intermediate code in said instruction register; and
   a video interface logic means coupled to said horizontal logic means and said vertical logic means, said video interface logic means for outputting said video output data.

3. An apparatus as in claim 2 wherein said video convertor further comprises:
   a run length counter coupled to said instruction register and to said video interface logic means for counting run length codes to zero and transferring the results to said video interface logic means.

4. An apparatus as in claim 3 wherein said video convertor further comprises:
   a dot shift matrix coupled to said instruction register and to said horizontal logic means, said dot shift matrix for converting said intermediate code directly to a predetermined dot matrix for printing.

* * * * *